United States Patent
Powers et al.

(10) Patent No.: US 9,769,250 B2
(45) Date of Patent: *Sep. 19, 2017

(54) FIGHT-THROUGH NODES WITH DISPOSABLE VIRTUAL MACHINES AND ROLLBACK OF PERSISTENT STATE

(71) Applicant: Architecture Technology Corporation, Minneapolis, MN (US)

(72) Inventors: Judson Powers, Ithaca, NY (US); Stephen K. Brueckner, Ithaca, NY (US); Robert A. Joyce, Ithaca, NY (US); Kenneth J. Thurber, Hopkins, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/791,089

(22) Filed: Jul. 2, 2015

(65) Prior Publication Data

US 2015/0309831 A1  Oct. 29, 2015

Related U.S. Application Data

(63) Continuation-in-part of application No. 14/011,642, filed on Aug. 27, 2013.

(Continued)

(51) Int. Cl.
*H04L 29/06* (2006.01)
*H04L 29/08* (2006.01)
(Continued)

(52) U.S. Cl.
CPC .......... *H04L 67/10* (2013.01); *G06F 9/466* (2013.01); *G06F 11/1464* (2013.01);
(Continued)

(58) Field of Classification Search
CPC .. H04L 63/145; G06F 21/606; G06F 11/1469; G06F 21/50; G06F 21/53;
(Continued)

(56) References Cited

U.S. PATENT DOCUMENTS 7,076,801 B2  7/2006  Gong et al.
7,134,123 B1  11/2006  Berry et al.
(Continued)

FOREIGN PATENT DOCUMENTS

EP  2884392  * 12/2013

OTHER PUBLICATIONS

Prosecution History from US. Appl. No. 14/011,642, dated Aug. 27, 2013 through Sep. 24, 2015 68 pp.
(Continued)

*Primary Examiner* — Joseph P Hirl
*Assistant Examiner* — Chi Nguy
(74) *Attorney, Agent, or Firm* — Shumaker & Sieffert, P.A.

(57) ABSTRACT

A server system receives messages from client computing devices. Each of the messages corresponds to a transaction. The server system assigns each respective transaction to a respective fresh virtual machine. Furthermore, the server system performs, as part of a respective virtual machine processing a respective transaction, a modification associated with the respective transaction to a shared database. The shared database is persisted independently of the plurality of virtual machines. In response to determining that processing of the respective transaction is complete, the server system discards the respective virtual machine. In response to a trigger, such as determining that the respective transaction is associated with a cyber-attack, the server system uses checkpoint data associated with the respective transaction to roll back the modifications associated with the respective transaction to the shared database.

23 Claims, 11 Drawing Sheets

Related U.S. Application Data

(60) Provisional application No. 61/863,801, filed on Aug. 8, 2013, provisional application No. 62/050,665, filed on Sep. 15, 2014.

(51) Int. Cl.

| | |
|---|---|
| *G06F 17/30* | (2006.01) |
| *G06F 11/14* | (2006.01) |
| *G06F 9/46* | (2006.01) |
| *G06F 21/60* | (2013.01) |
| *G06F 21/55* | (2013.01) |
| *G06F 9/455* | (2006.01) |

(52) U.S. Cl.
CPC ...... *G06F 11/1469* (2013.01); *G06F 17/3051* (2013.01); *G06F 21/55* (2013.01); *G06F 21/606* (2013.01); *H04L 63/145* (2013.01); *H04L 63/1441* (2013.01); *G06F 2009/4557* (2013.01); *G06F 2009/45583* (2013.01); *G06F 2009/45587* (2013.01); *G06F 2201/815* (2013.01)

(58) Field of Classification Search
CPC ........ G06F 21/55; G06F 21/56; G06F 21/566; G06F 21/568
See application file for complete search history.

(56) References Cited

U.S. PATENT DOCUMENTS

| | | | |
|---|---|---|---|
| 7,350,234 B2 | 3/2008 | Goseva-Popstojanova et al. | |
| 7,607,129 B2 | 10/2009 | Rosu et al. | |
| 8,510,747 B2 | 8/2013 | Tian et al. | |
| 8,640,238 B2 | 1/2014 | Brueckner et al. | |
| 8,839,426 B1 | 9/2014 | Brueckner et al. | |
| 9,094,449 B2 | 7/2015 | Brueckner et al. | |
| 9,473,526 B2 | 10/2016 | Brueckner et al. | |
| 2005/0198303 A1* | 9/2005 | Knauerhase | G06F 9/5055 709/227 |
| 2008/0263658 A1* | 10/2008 | Michael | G06F 21/562 726/22 |
| 2009/0007100 A1 | 1/2009 | Field et al. | |
| 2009/0313620 A1 | 12/2009 | Sedukhin et al. | |
| 2010/0043073 A1 | 2/2010 | Kuwamura | |
| 2010/0185596 A1* | 7/2010 | Dee | G06F 17/30289 707/695 |
| 2010/0269167 A1 | 10/2010 | Kashima | |
| 2012/0042365 A1 | 2/2012 | Shoval et al. | |
| 2012/0110570 A1 | 5/2012 | Jacobson | |
| 2012/0259816 A1 | 10/2012 | Cargille et al. | |
| 2013/0055256 A1 | 2/2013 | Banga et al. | |
| 2013/0097603 A1 | 4/2013 | Amano et al. | |
| 2013/0166703 A1 | 6/2013 | Hammer et al. | |
| 2013/0227710 A1* | 8/2013 | Barak | G06F 21/10 726/29 |
| 2014/0096134 A1* | 4/2014 | Barak | G06F 9/45558 718/1 |
| 2014/0310810 A1 | 10/2014 | Brueckner | |
| 2015/0033221 A1* | 1/2015 | Chari | H04L 63/105 718/1 |

OTHER PUBLICATIONS

Response to the Office Action mailed Sep. 24, 2015, from U.S. Appl. No. 14/011,642, filed Dec. 23, 2015, 15 pp.

Final Rejection from U.S. Appl. No. 14/011,642, dated May 5, 2016, 18 pp.

Notice of Allowance from U.S. Appl. No. 14/011,642, mailed May 4, 2017, 7 pgs.

Office Action from U.S. Appl. No. 15/295,778, dated May 8, 2017, 7 pgs.

"SHelp: Automatic Self-healing for Multiple Application Instances in a Virtual Machine Environmentz", Gang Chen, Hai Jin, Dequing Zou, Bing Bing Zhou, Weizhong Qiang and Gang Hu, Huazhong University of Science and Technology, Wuhan, 430074, China, 2010 IEEE International Conference on Cluster Computing, pp. 97-106.

Office Action from U.S. Appl. No. 14/011,642, dated Nov. 3, 2016, 17 pp.

Rutkowska, "Disposable VMs," The Invisible Things Lab's blog, Kernel, Hypervisor, Virtualization, Trusted Computing and other system-level security stuff, Jun. 1, 2010, 7pp.

Matthews et al.. "Data Protection and Rapid Recovery From Attack With a Virtual Private File Server and Virtual Machine Appliances," Clarkson University, 2005, 12 pp.

Reynolds et al., "The Design and Implementation of an Intrusion Tolerant System," IEEE Proceedings of the International Conference on Dependable Systems and Networks (DSN'02), 2002, 6 pp.

"Install SharePoint 2013 across multiple servers for a three-tier farm," SharePoint 2013, Jul. 16, 2012, 13 pp.

Verissimo, "MAFTIA—Malicious and Accidental Fault Tolerance for Internet Applications," TF-CSIRT Workshop, Sep. 2005, 14 pp.

"Organically Assured and Survivable Information Systems (OASIS) Technology Transition Assessment (OTIA)," AFRL-IF-RS-TR-2004-67, Final Technical Report, Mar. 2004, 56 pp.

"VMware vSphereTM 4 Fault Tolerance: Architecture and Performance," White paper, VMware, Inc., 2009, 19 pp.

"VMware High Availability," Easily Deliver High Availability for All of Your Virtual Machines, VMware, Inc., 2009, 2 pp.

Wang et al., "SafeFox: a Safe Lightweight Virtual Browsing Environment," Proceedings of the 43rd Hawaii International Conference on System Sciences—2010, 10 pp.

Reiser et al., "VM-FIT: Supporting Intrusion Tolerance with Virtualisation Technology," Proceedings of the 1st Workshop on Recent Advances in Intrusion-Tolerant Systems, pp. 18-22, 2007.

Borman et al., "A Serially Reusable Java(tm) Virtual Machine Implementation for High Volume, Highly Reliable, Transaction Processing," Accessed Apr. 29, 2013, 21 pp.

Hachman, "Facebook's Web Server Strategy: 'Chinese Foot Soldiers'," PCMag.com, Mar. 15, 2011, 4pp.

Shi et al., "An Intrusion-Tolerant and Self-Recoverable Network Service System Using a Security Enhanced Chip Multiprocessor," IEEE Proceedings of the Second International Conference on Autonomic Computing (ICAC'05), 2005, 11pp.

Prosecution History from U.S. Pat. No. 8,839,242, dated Aug. 29, 2013 through Aug. 14, 2014, 102 pp.

Alberts et al., "Mission Assurance Analysis Protocol (MAAP): Assessing Risk in Complex Environments," retrieved from http://www.sei.cmu.edu/reports/05tn032.pdf, Sep. 2005, 59 pp.

Bargar, "DOD Global Information Grid Mission Assurance," CrossTalk, the Journal of Defense Software Engineering, retrieved at http://www.crosstalkonline.org/storage/issue-archives/2008/200807/200807-Bargar.pdf, Jul. 2008, 3 pp.

Department of Defense Instruction, "Information Assurance (IA) Implementation," retrieved from http://www.dtic.mil/whs/directives/corres/pdf/850002.pdf, Feb. 6, 2003, 102 pp.

Duren, "Organically Assured and Survivable Information Systems (OASIS) Technology Transition Assessment (OTTA)," Defense Advanced Research Projects Agency, DARPA Order No. K128, N684m P004, Mar. 2004, 56 pp.

Leech et al., "Socks Protocol Version 5," Network Working Group, RFC 1928, Mar. 1996, 9 pp.

MAFTIA, "Malicious- and Accidental-Fault Tolerance for Internet Applications," IST Research Project IST-1999-11583, retrieved at http://spiderman-2.laas.fr/TSF/cabernet/maftia/index.html, Jan. 1, 2000-Feb. 28, 2003, 2 pp.

Response to Office Action dated Nov. 3, 2016, from U.S. Appl. No. 14/011,642, filed February 3, 2017, 14 pp.

Prosecution History from U.S. Appl. No. 14/165,368, dated Jun. 10, 2014 through Jun. 29, 2015, 31 pp.

(56) References Cited

OTHER PUBLICATIONS

Prosecution History from U.S. Appl. No. 14/809,926, dated Mar. 24, 2016 through Jun. 17, 2016, 19 pp.
Notice of Allowance from U.S. Appl. No. 13/352,148 dated Sep. 30, 2013, 14 pp.

* cited by examiner

Transaction and Worker Details

| Transaction (ID) ▽△ | Client IP ▽△ | Duration (seconds) ▽△ | Traffic in/out (bytes) ▽△ | Worker (ID) ▼△ | Mem (%) ▽△ | CPU (%) ▽△ |
|---|---|---|---|---|---|---|
| 90341231 | 172.24.5.33 | 2.016 | 1024/56 | 4 | 93 | 15 |
| 83472883 | 223.169.4.12 | 1.110 | 664/550 | 12 | 35 | 7 |
| 23123412 | 56.104.5.140 | 2.532 | | 23 | 87 | 77 |
| ... | | | | | ... | ... |

Select Columns...
Reorder Columns...
Sort by...

Drop connection
Pause worker
Kill worker
Repair worker
Save worker state
— 342

Global Statistics — 360

| Time Period ▲▽ | Transactions (quantity) ▽△ | Traffic In (mb) ▽△ | Traffic Out (mb) ▽△ | Worker Usage (%) ▽△ | Worker Startup time (avg secs) ▽△ | Worker Refresh time (avg secs) ▽△ |
|---|---|---|---|---|---|---|
| Startup | 899433 | 123444 | 9883431 | 25 | 2.3 | 2.5 |
| Month | 34435 | 9389 | 23234 | 34 | 1.7 | 2.1 |
| Week | ... | ... | ... | ... | ... | ... |
| Day |  |  |  |  |  |  |
| Hour |  |  |  |  |  |  |
| Minute |  |  |  |  |  |  |

Select Columns...
Reorder Columns...
Sort by...

FIG. 9

FIGHT-THROUGH NODES WITH DISPOSABLE VIRTUAL MACHINES AND ROLLBACK OF PERSISTENT STATE

This application is a continuation-in-part of U.S. patent application Ser. No. 14/011,642, filed Aug. 27, 2013, which claims the benefit of U.S. Provisional Patent Application No. 61/863,801, filed Aug. 8, 2013, the entire content of each of which is incorporated herein by reference. Additionally, this application claims the benefit of U.S. Provisional Patent Application 62/050,665, filed Sep. 15, 2014, the entire content of which is incorporated herein by reference.

BACKGROUND

Despite the best security efforts, compromises of information systems continue to occur. While the best practice response to a cyber-attack may be to isolate an attacked network or node, this is often not an acceptable course of action for mission-critical systems. For mission-critical resources, a network or node should be capable of carrying on, even in a degraded state, during a cyber-attack, continuing to provide critical services. Such systems, called "resilient" or "survivable" systems, are able to "fight through" cyber-attacks in order to achieve mission objectives.

Human reaction times are very slow in comparison to the speed of cyber-attacks, which can occur within milliseconds. A survivable system should be able to react to attacks more quickly than can be accomplished through manual intervention. Survivable systems therefore may provide a high degree of automation, so the network or node can dynamically respond to threats in real time.

SUMMARY

In general, the techniques of this disclosure relate to fight-through nodes that may enable network services and/or computers to continue operation despite compromise due to malicious cyber-attack. Such fight-through nodes may replace or augment nodes, such as servers on enterprise networks, governmental networks, or other types of networks. In some examples, fight-through nodes may utilize disposable virtual machines with reduced rollback procedures to provide swift and efficient recovery from compromised states. Fight-through nodes with disposable virtual machines may be referred to as "FTN-Ds."

The techniques may allow for a "survivable network" in which one or more network devices may be able to "fight through" cyber-attacks. This may be of particular value in critical network operations. The "survivable" network may be capable of carrying on, in a perhaps degraded state, during an attack so as to continue to provide critical services. Because human reaction times can be very slow in comparison to the speed of cyber-attacks, the survivable system may be utilized to provide an automated response capability so the network can dynamically respond to threats.

A FTN-D is described herein, which may be a combined hardware/software system that enhances existing networks with survivability properties. The FTN-Ds may replace existing nodes within a network, such as nodes hosting critical services in the network. Example nodes include database servers, information systems, application servers, email servers, FTP servers, web servers or even network infrastructure such as layer three routers or layer two switches, firewalls, intrusion detection system, gateways or the like. A network equipped with one or more FTN-Ds as described herein may be resilient, enabling critical processes to operate despite attacks on nodes or impacts on other parts of the network.

As enterprises rely ever more heavily on their information systems, the frequency and sophistication of cyber-attacks continues to rise. The techniques described herein may improve the survivability of a network's critical server nodes, making it possible to fight through cyber-attacks. Rather than being disabled by such attacks, servers providing critical services may continue to operate in spite of the attack. Entities may use the FTN-Ds described herein to replace critical nodes of their network or information systems. The assurance provided by the FTN-Ds may be applicable to a variety of industries having critical systems (e.g., utilities, health care, financial services, transportation, military, telecom, retail, information technology, etc.).

In some examples, a network device, such as a server computing system, may operate in accordance with the techniques described herein to provide resiliency and survivability. For example, the network device may receive messages from client computing devices. Each of the messages or series of messages may correspond to a different transaction to be processed by a server computing system. When processing the transactions, the server computing system may assign each respective transaction to a respective fresh (i.e., new) virtual machine. The new virtual machine provides a known, clean operating environment for processing the particular transaction. Furthermore, the server computing system may perform, as part of a respective virtual machine processing a respective transaction, a modification associated with the respective transaction to a shared database that stores system state information for the server computing system. The shared database may be persisted independently of the plurality of virtual machines and may provide a mechanism by which state information may persist and may be propagated for use by subsequent transactions for the client computing devices. In response to determining that processing of the respective transaction is complete, the server system may discard the respective virtual machine. In response to determining that the respective transaction is associated with a cyber-attack, the server system may use checkpoint data of the persistent storage to roll back the modifications associated with the respective transaction to the shared database. In this way, in some implementations, only the persistent storage needs to be rolled back. In some examples, checkpoint data and rollback mechanisms for the operating environment for executing the transactions, i.e., the virtual machines, do not need to be utilized.

In one example, this disclosure describes a method comprising initializing, by a computing system, a plurality of virtual machines that execute on one or more computing devices of the computing system. The method also comprises receiving, by the computing system, a plurality of messages from one or more client computing devices, each of the plurality of messages corresponding to a transaction in a plurality of transactions. For each respective transaction in the plurality of transactions, the method comprises assigning, by the computing system, the respective transaction to a respective virtual machine from the plurality of virtual machines. The respective transaction is the first transaction assigned to the respective virtual machine. The method also comprises generating, by the respective virtual machine, as part of the respective virtual machine processing the respective transaction, a database modification request associated with the respective transaction. In addition, the method comprises performing a modification to a shared database in response to the database modification request associated with the respective transaction. The shared database is persisted independently of the plurality of virtual machines. The method also comprises generating checkpoint data associated with the respective transaction. Furthermore, the method comprises, in response to determining that processing of the respective transaction is complete, discarding the respective virtual machine. The method also comprises in response to determining that the respective transaction is associated with a cyber-attack, using the checkpoint data associated with the respective transaction to roll back the modification to the shared database performed in response to the database modification request associated with the respective transaction.

In another example, this disclosure describes a computing system comprising: a shared database and one or more computing devices configured to initialize a plurality of virtual machines that execute on one or more of the computing devices of the computing system. Furthermore, the one or more computing devices are configured to receive a plurality of messages from one or more client computing devices, each of the plurality of messages corresponding to a transaction in a plurality of transactions. For each respective transaction in the plurality of transactions, the one or more computing devices are configured to assign the respective transaction to a respective virtual machine from the plurality of virtual machines. The respective transaction is the first transaction assigned to the respective virtual machine. Furthermore, the one or more computing devices are configured to generate, as part of the respective virtual machine processing the respective transaction, a database modification request associated with the respective transaction. In addition, the one or more computing devices are configured to perform a modification to the shared database in response to the database modification request associated with the respective transaction. The shared database is persisted independently of the plurality of virtual machines. The one or more computing devices are also configured to generate checkpoint data associated with the respective transaction. The one or more computing devices are configured such that, in response to determining that processing of the respective transaction is complete, the one or more processors discard the respective virtual machine. In addition, the one or more computing devices are configured such that, in response to determining that the respective transaction is associated with a cyber-attack, the one or more processors use the checkpoint data associated with the respective transaction to roll back the modification to the shared database performed in response to the database modification request associated with the respective transaction.

In another example, this disclosure describes a computer-readable data storage medium having stored thereon instructions that, when executed, configure a computing system to initialize a plurality of virtual machines that execute on one or more computing devices of the computing system. The instructions also configure the computing system to receive a plurality of messages from one or more client computing devices, each of the plurality of messages corresponding to a transaction in a plurality of transactions. For each respective transaction in the plurality of transactions, the instructions configure the computing system to assign the respective transaction to a respective virtual machine from the plurality of virtual machines, wherein the respective transaction is the first transaction assigned to the respective virtual machine. The instructions also configure the computing system to generate, as part of the respective virtual machine processing the respective transaction, a database modification request associated with the respective transaction. Furthermore, the instructions configure the computing system to perform a modification to a shared database in response to the database modification request associated with the respective transaction. The shared database is persisted independently of the plurality of virtual machines. In addition, the instructions configure the computing system to generate checkpoint data associated with the respective transaction. In response to determining that processing of the respective transaction is complete, the instructions configure the computing system to discard the respective virtual machine. In response to determining that the respective transaction is associated with a cyber-attack, the instructions configure the computing system to use the checkpoint data associated with the respective transaction to roll back the modification to the shared database performed in response to the database modification request associated with the respective transaction.

In another example, this disclosure describes a network node comprising a hardware-based processing system having a set of one or more processing units. The network node also comprises a plurality of virtual machines (VMs) executing on the one or more processing units. In addition, the network node comprises a dispatcher that receives, from one or more client computing devices, a plurality of messages associated with transactions. The dispatcher also assigns each of the transactions to the plurality of virtual machines. In addition, the dispatcher discards each of the VMs when the transactions assigned to the VMs are complete. The network node also comprises one or more intrusion detection systems that detect whether any of the VMs has been compromised and whether a shared database has been compromised. In addition, the network node comprises a checkpointing module that generates checkpoint data based on requests from the VMs to modify the shared database. Furthermore, the network node comprises a rollback module that uses the checkpoint data to roll back modifications to the shared database that are associated with a particular transaction when the one or more intrusion detection systems determine that a VM to which the particular transaction was assigned has been compromised or the shared database has been compromised.

In another example, this disclosure describes a method comprising initializing, by a computing system and from one or more common templates, a virtual machine that executes on one or more computing devices of the computing system. In addition, the method comprises, responsive to an occurrence of an initiation condition of a transaction, assigning, by the computing system, the transaction to the virtual machine. The method also comprises generating, by the virtual machine, as part of the virtual machine processing the transaction, a database modification request associated with the transaction. In addition, the method comprises, responsive to the database modification request associated with the transaction, performing a modification to a shared database that is persisted independently of the virtual machine. The method also comprises generating checkpoint data associated with the transaction. Additionally, the method comprises, responsive to a trigger, discarding, by the computing system, the virtual machine. Furthermore, the method comprises, responsive to a rollback request, using the checkpoint data associated with the transaction to roll back the modification to the shared database performed responsive to the database modification request associated with the transaction.

In another example, this disclosure describes a computing system comprising: a shared database and one or more computing devices. The one or more computing devices are configured to initialize, from one or more common templates, a virtual machine that executes on one or more computing devices of the computing system. The one or more computing devices are further configured such that, responsive to an occurrence of an initiation condition of a transaction, the one or more computing devices assign the transaction to the virtual machine. In addition, the one or more computing devices are configured to generate, as part of the virtual machine processing the transaction, a database modification request associated with the transaction. Furthermore, the one or more computing devices are configured such that, responsive to the database modification request associated with the transaction, the one or more processors perform a modification to the shared database that is persisted independently of the virtual machine. Additionally, the one or more processors are configured to generate checkpoint data associated with the transaction. The one or more computing devices are configured such that, responsive to a trigger, the one or more processors discard the virtual machine. Furthermore, the one or more computing devices are configured such that, responsive to a rollback request, the one or more computing devices use the checkpoint data associated with the transaction to roll back the modification to the shared database performed responsive to the database modification request associated with the transaction.

In another example, this disclosure describes a non-transitory computer readable data storage medium having instructions stored thereon that, when executed, cause a computing system to initialize, from one or more common templates, a virtual machine that executes on one or more computing devices of the computing system. The instructions further cause the computing system to, responsive to an occurrence of an initiation condition of a transaction, assign the transaction to the virtual machine. The instructions also cause the computing system to generate, as part of the virtual machine processing the transaction, a database modification request associated with the transaction. Furthermore, the instructions cause the computing system to, responsive to the database modification request associated with the transaction, perform a modification to a shared database that is persisted independently of the virtual machine. Additionally, the instructions cause the computing system to generate checkpoint data associated with the transaction. The instructions also cause the computing system to discard, responsive to a trigger, the virtual machine. In addition, the instructions cause the computing system to, responsive to a rollback request, use the checkpoint data associated with the transaction to roll back the modification to the shared database performed responsive to the database modification request associated with the transaction.

The techniques may provide improved survivability in networks via technologies enhancing likelihood of continuity and transaction completion, allowing network operation to persist under conditions of extreme attack and/or degraded performance. Architectural and operational strategies are described that may ensure survivability, resiliency, and adaptability to "fight through" severe cyber degradation and compromise, and/or to make the adversary's job harder and more costly. The techniques described herein may strengthen cyber readiness in a contested and degraded cyber operational environment, providing a set of automated capabilities to respond dynamically to escalating threats.

The details of one or more embodiments of the invention are set forth in the accompanying drawings and the description below. Other features, objects, and advantages of the invention will be apparent from the description, drawings, and claims.

BRIEF DESCRIPTION OF DRAWINGS

FIG. 8 is a conceptual diagram illustrating an example transaction and worker details table, in accordance with one or more techniques of this disclosure.

FIG. 9 is a conceptual diagram illustrating an example global statistics table, in accordance with one or more techniques of this disclosure.

DETAILED DESCRIPTION

Figure 1:
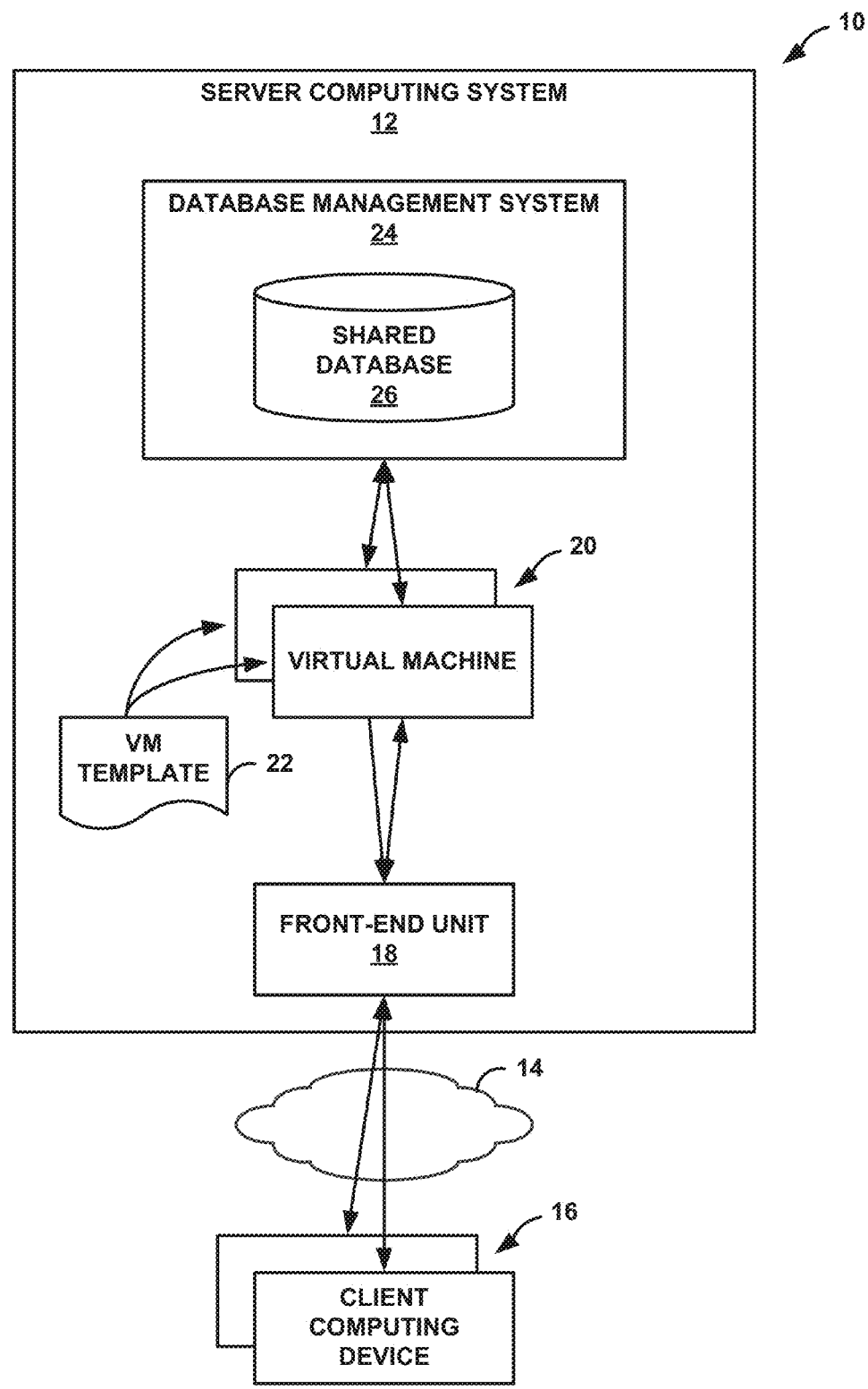
FIG. 1 is a block diagram illustrating an example system that may utilize one or more techniques of this disclosure.

An entity may initiate a cyber-attack in order to cause a computing system to perform actions not desired by an operator of the computing system. For example, an entity may initiate a cyber-attack in order to cause the computing device to provide sensitive data to the entity without permission from the operator of the computing system. In another example, an entity may initiate a cyber-attack in order to cause the computing device to become non-functional.

Many types of cyber-attacks are implemented by causing a low access level process of a server computing system to store malicious software code (e.g., malware) and/or other malicious data. For example, the low access level process may embed malicious software code and/or other malicious data in one or more operating system files, random access memory, or a Basic Input/Output System (BIOS). Although this disclosure refers to software or data associated with cyber-attacks as being "malicious," cyber-attacks may be initiated for lawful purposes. A process with a higher access level (e.g., an operating system) may then execute the malicious software code or otherwise use the malicious data. The subsequent execution of the software code or use of the malicious data by the higher access level process may cause the server computing system to perform actions not desired by an operator of the computing system.

For example, a client computing device may initiate a cyber-attack on a server computing system by sending a request for the server computing system to perform a first transaction. The transaction may be a discrete unit of interaction between the server computing system and a client computing device. In this example, the server computing system may execute the first transaction, which causes the server computing system to store malicious software code in a random access memory (RAM) or a persistent storage device associated with the server computing system. In this example, the malicious software code may persist after execution of the first transaction is complete. Furthermore, in this example, the server computing system may execute a second transaction. The second transaction may or may not be associated with the cyber-attack. During execution of the second transaction, the server computing system may execute or otherwise use the malicious software code, resulting in the server computing system performing actions not desired by the operator of the server computing system, such as divulging secret data.

The techniques of this disclosure may at least partially address one or more of the problems described above. For example, a server computing system may receive messages from client computing devices. The messages may include requests from client computing devices for the server computing system to initiate transactions. In this disclosure, a "transaction" may be a discrete unit of interaction between a server computing system and a remote client computing device. In this example, the server computing system may assign each of the transactions of a different virtual machine (VM). When the server computing system assigns a transaction to a VM, the VM is in a "fresh" state, meaning that the server computing system has not previously assigned a transaction to the VM. Because the VM is in a fresh state, there may be no opportunity for a previous transaction to infect the VM with malicious software code or malicious data. After the transaction is complete, the server computing system may discard the VM. Thus, in this example, the server computing system does not assign another transaction to the VM or otherwise reuse the VM. In this way, each VM instance may process one (or more) transactions for a client and is then deleted. This periodic deletion of VMs may prevent an attacker from gaining a foothold within the server computing system's execution environment.

Furthermore, the server computing system may be associated with a shared database. The shared database may be persistent independent from any of the VMs. When VMs execute transactions, the VMs may request modifications to data in the shared database. Such modifications may include additions to the data in the shared database, modifications of existing data in the shared database, deletions of existing data in the shared database, and so on. In accordance with some examples of this disclosure, the server computing system may generate checkpoints associated with the transactions. If a particular transaction is suspected of being associated with a cyber-attack, the server computing system may use one or more checkpoints associated with the particular transaction to roll back changes to the shared database initiated by execution of the particular transaction. Rolling back changes to the shared database may help to prevent the storage of malicious code or malicious data in the shared database.

FIG. 1 is a block diagram illustrating an example system 10 that may utilize one or more techniques of this disclosure.

In the example of FIG. 1, system 10 includes a server computing system 12, a network 14, and a plurality of client computing devices 16. Other examples may include more, fewer, or different components, devices, and/or systems.

Server computing system 12 may provide a Fight-Through Node with Disposable virtual machines (FTN-D). In general, FTN-Ds may be computer systems that are resilient against cyber compromise. In other words, FTN-Ds may be designed to be resilient to attacks and operate reliably despite compromise. As described herein, server computing system 12 may use a pool of ephemeral VMs to isolate and destroy malware (i.e., malicious software and/or data) in applications' primary execution environments. Furthermore, as described herein, persistent data managed by server computing system 12 may be frequently (e.g., periodically) check-pointed so that changes to the persistent data may be rapidly rolled back to previous states if compromise is suspected. That is, the technologies used to achieve resiliency may include sandboxing, disposable virtual machines, parallel processing, rapid checkpointing, and rapid restoration. While survivable against many network attacks (i.e., cyber-attacks), the design of an FTN-D may be particularly effective against more insidious host-based attacks that compromise a server.

Server computing system 12 (i.e., a FTN-D) may replace or augment nodes (e.g., servers) on enterprise networks, military networks, governmental networks, or other types of networks. In some examples, an FTN-D may be an intrusion-tolerant system that is used to replace network nodes (e.g., servers) hosting mission-critical services in a network. Networks equipped with FTN-Ds may be resilient, enabling critical processes to operate despite successful attacks on nodes of the network.

Server computing system 12 may be implemented using one or more computing devices. Each of the one or more computing devices may be a physical device for processing information. Example types of computing devices may include server computing devices, personal computers, mobile computing devices, in-vehicle computing devices, and other types of physical devices for processing information. In some examples, the FTN-D provided by server computing system 12 comprises a software solution that may optionally include dedicated hardware (e.g., one or more physical servers that use VMs to run the same network-available services as an existing server). Furthermore, in some examples, server computing system 12 may comprise commodity hardware located physically and logically inside an entity's (e.g., an enterprise's) network. In other examples, server computing system 12 may provide the FTN-D as a cloud service, using cloud resources instead of local hardware. A cloud-based version of a FTN-D may flexibly scale up or down the number of VMs in a pool of initialized VMs depending on client traffic.

Each of client computing devices 16 may comprise one or more computing devices. For example, client computing devices 16 may include personal computers, mobile computing devices (e.g., laptops, smartphones, tablet computers, etc.), server computing devices, intermediate network devices (e.g., routers, switches, etc.), and/or other types of physical devices for processing information. A client computing device acts as a client of a service, such as a service provided by a server device.

Network 14 may facilitate communication between client computing devices 16 and server computing system 12. Network 14 may include various types of communication networks. For example, network 14 may include one or more cellular data networks, one or more wired or wireless local area networks (LANs), one or more wide area networks (WANs), the Internet, and/or another type of communication network.

In the example of FIG. 1, server computing system 12 comprises a front-end unit 18, a plurality of virtual machines (VMs) 20, a VM template 22, and a database management system 24. Front-end unit 18, VMs 20, and database management system 24 may be implemented as software executed by one or more processors of the one or more computing devices of server computing system 12. Furthermore, in some examples, front-end unit 18, VMs 20, and database management system 24 may be implemented as software executed by one or more processors of different computing devices of server computing system 12. Thus, in such examples, front-end unit 18 may be implemented as software executed by one or more processors of a first computing device of server computing system 12, database management system 24 may be implemented as software executed by one or more processors of a second computing device of server computing system 12, and VMs 20 may be implemented as software executed by one or more processors of one or more additional computing devices of server computing system 12.

Front-end unit 18 may comprise one or more front-end components that mediate between external clients (e.g., client computing devices 16) and VMs 20 by forwarding transaction traffic. For example, front-end unit 18 may comprise a listener, a connection handler, a proxy, a dispatcher, an accumulator, a logger, and/or other front-end components.

Front-end unit 18 may receive messages from client computing devices 16 via network 14. The messages may include various types of information. For example, front-end unit 18 may receive, from one of client computing devices 16, a message that implicitly or explicitly includes a request to initiate a transaction. The transaction may be a discrete unit of interaction between server computing system 12 and the client computing device. In one example, the transaction may be a Transmission Control Protocol (TCP) connection (i.e., a TCP session). In this example, front-end unit 18 may receive a TCP SYN message from the client computing device. The TCP SYN message may include a request to initiate a TCP connection. In other examples, the transaction may be a SQL session or another type of session. In examples where a transaction is a session, server computing system 12 may receive multiple messages associated with the session. In other examples, the transaction may comprise a single message, such as a Hypertext Transfer Protocol (HTTP) request. In another example, a transaction may be an application-level message from one of client computing devices 16 followed by a corresponding return message from server computing system 12. Because many network protocols are designed with a transactional model, the approach of this example may be applicable to a wide variety of services.

In examples where transactions are TCP sessions, the techniques of this disclosure may be applicable to any application based on TCP. Furthermore, in such examples, it may not be necessary to customize front-end unit 18 for each application by specifying how applications define transactions. Examples where transactions are TCP sessions may require less overhead to process complex client-server interactions than examples where transactions are application-level messages, and may therefore be performed faster and more securely. In some instances, front-end units (e.g., firewall, handler, dispatcher, etc.) that operate on a TCP session level may be less complex (and hence have a smaller attack surface) than front-end units that operate at an application level.

In response to receiving, from one of client computing devices 16, a message that comprises a request to initiate a transaction, front-end unit 18 may assign the transaction to one of virtual machines 20. In addition, front-end unit 18 may forward the message to the virtual machine assigned to the transaction. In some examples, front-end unit 18 may receive, from the client computing device, additional messages associated with the transaction. In such examples, front-end unit 18 may forward the additional messages to the virtual machine assigned to the transaction. For example, front-end unit 18 may receive a TCP SYN message from a client computing device and may assign the corresponding TCP session to one of VMs 20. In this example, front-end unit 18 may forward the TCP SYN message to the assigned VM and may also forward other TCP messages associated with the TCP session (e.g., TCP ACK messages, TCP FIN messages, etc.) to the assigned VM.

In some examples, front-end unit 18 does not assign a transaction to one of VMs 20 if front-end unit 18 has previously assigned a transaction to the VM. Thus, when front-end unit 18 assigns a transaction to one of VMs 20, the VM may be in a "fresh" state. In other words, a fresh VM is used for each transaction. It may be possible for front-end unit 18 to assign each transaction to a different fresh VM by handling transactions in disposable VMs. In general, a disposable VM may be a VM intended to be used briefly and discarded. Each of VMs 20 may be a disposable VM.

In some examples, because none of VMs 20 has previously processed a transaction, there may be no opportunity for a previous transaction to install malicious code or malicious data on VMs 20, or otherwise reconfigure VMs 20. Thus, using disposable VMs to interact with other computers may prevent stealth malware from persistently infecting server computing system 12 or other computing systems by embedding itself in sensitive data storage areas, such as operating system files of VMs 20, in RAM, a cache, registers, or a BIOS.

In the example of FIG. 1, each of VMs 20 is based on a VM template 22. Thus, each of VMs 20 may have the same initial state. For instance, each of VMs 20 may be based on an image that includes executable software code, an operating system, drivers and all components that provide the operating environment for executing the transactions. In other words, prior to one of VMs 20 being assigned a transaction, the VM may have the same state as each other one of VMs 20 that has not yet been assigned a transaction for execution. VM template 22 may be stored on a persistent or volatile storage medium accessible by server computing system 12. Furthermore, VM template 22 may be determined to be free of malicious code and malicious data, or otherwise approved for use (e.g., following testing, assertion, or by other means). In this way, VMs 20 may all be instantiated from a common template (which can be hardened and known to be clean of infection). In other words, each of the plurality of VMs 20 may be initialized from a common template that has been determined to be free of malware infection.

In some examples, front-end unit 18 may initialize a VM from VM template 22 in response to front-end unit 18 receiving a request to initiate a transaction. In such examples, after initializing the VM, front-end unit 18 may assign the transaction to the newly initialized VM. Thus, initializing a VM may be part of assigning a transaction to the VM. In some examples, front-end unit 18 may initialize a VM in response to front-end unit 18 receiving a request to initiate a TCP session. Thus, in such examples, each new TCP session may cause a new VM to be launched (e.g., initialized).

In other examples, front-end unit 18 may initialize a pool of VMs from VM template 22. The pool of VMs may include a plurality of VMs. In such examples, when front-end unit 18 receives a request to initiate a transaction and assigns the transaction to a VM, front-end unit 18 may select the VM from among the pool of VMs. Thus, front-end unit 18 may assign the transaction to a VM that was initialized prior to front-end unit 18 receiving the request to initiate the transaction. In this way, a new VM may be instantiated for each incoming transaction, either on demand or pre-fetched.

Each of VMs 20 may comprise a software implementation of a machine (i.e., a computing device) that executes programs like a physical machine. Furthermore, VMs 20 may contain one or more applications (e.g., servers) that process client transactions. In some examples, the FTN-D provided by server computing system 12 may run a single application (e.g., a web server) which runs inside each VM instance (e.g., each of VMs 20). In alternative examples, the FTN-D may run multiple applications, either by running multiple applications within the same VM instances (e.g., VMs 20), or by dedicating different VM instances to different applications.

In some examples, one or more of VMs 20 may comprise a system VM (i.e., an operating system-level VM). A system virtual machine may provide a complete system platform that supports execution of a complete operating system, such as Microsoft Windows, Linux, and so on. In some examples where VMs 20 are system virtual machines, VMs 20 may implement hardware virtualization. In other examples, one or more of VMs 20 may be a process VM (i.e., an application-level VM). A process VM may run a single application. Ideally, an application running on a process VM may only use resources and abstractions provided by the process VM.

Furthermore, in some examples, server computing system 12 may use one or more hypervisors to support one or more of VMs 20. A hypervisor may be a piece of software, firmware, and/or hardware that creates and runs VMs. In some examples, the hypervisor is a Type 1 hypervisor. In other examples, the hypervisor is a Type 2 hypervisor. A Type 1 hypervisor runs directly on a host computing device's hardware to control the hardware and to manage one or more guest operating systems (e.g., VMs). A Type 2 hypervisor may run within a conventional operating system environment.

In some examples, server computing system 12 may use a paravirtualization technique to support one or more of VMs 20. Paravirtualization is a virtualization technique that presents a software interface to VMs that is similar but not identical to that of the underlying hardware. Paravirtualization may require some modification to software. Furthermore, in some examples, server computing system 12 may use full virtualization to support one or more of VMs 20. Full virtualization may involve an almost complete simulation of the underlying hardware and may allow software (e.g., an operating system) to run unmodified. Thus, VMs 20 may be a variety of types (e.g., Type 1 hypervisor, Type 2 hypervisor, paravirtualized, fully virtualized, application-level, operating system-level, etc.). In other words, each of the plurality of VMs 20 may be a type I hypervisor, a type II hypervisor, a paravirtualized virtual machine, a fully virtualized virtual machine, an application-level virtual machine, or an operating system-level virtual machine.

In some examples, front-end unit 18 may assign transactions to VMs 20 such that VMs 20 execute the transactions serially in chronological order. That is, front-end unit 18 may wait to assign a transaction to a VM until another VM has finished processing a previous transaction. Assigning transactions to VMs in this way may help to enforce transaction ordering.

Alternatively, front-end unit 18 may assign transactions to VMs 20 such that VMs 20 may execute transactions in parallel. That is, front-end unit 18 may assign transactions to VMs 20 such that two or more of VMs 20 may be concurrently processing different transactions. Assigning transactions to VMs in this way may enable server computing system 12 to service multiple clients simultaneously or to service multiple transactions from a single client simultaneously. Thus, VMs 20 can execute client transactions serially in chronological order or in parallel.

After one of VMs 20 completes a transaction, server computing system 12 may discard the VM. For example, the transaction may be a TCP session that front-end unit 18 has assigned to a particular VM. In this example, server computing system 12 may discard the particular VM after the particular VM outputs a TCP FIN message to a client computing device and has received an ACK message from the client computing device in response to the TCP FIN message. In this way, when the TCP session ends, the particular VM is discarded. For example, a particular message may comprise a request to initiate a TCP session between server computing system 12 and a particular client computing device among client computing devices 16. In this example, server computing system 12 may determine that the particular transaction request is complete when the TCP session terminates. In another example, a transaction may consist of a single request from a client computing device and a single response from server computing system 12 to the request. Thus, in this example, the transaction may start when server computing system 12 receives the request and the transaction may be complete when server computing system 12 sends the response to the request.

When server computing system 12 discards one of VMs 20, server computing system 12 may return the resources of the VM to a pool of available resources and all state information of the VM may be lost. For example, each of VMs 20 may include RAM and a file system on a virtual "hard disk." In this example, a VM may use the file system on the VM's virtual "hard disk" to store application files, a database, and/or other types of data. In this example, data stored in the VM's RAM and virtual "hard disk" may be deleted, overwritten (e.g., with random data or "zero'ed out"), and/or become functionally inaccessible when the VM is discarded.

Because VMs 20 are discarded after VMs 20 complete transactions, any malware installed on VMs 20 while processing the transactions may be discarded along with VMs 20. For example, malware may be installed in one of VMs 20 while the VM is processing a transaction. That is, many types of cyber-attacks attempt to make permanent malicious changes to a machine (e.g., installation of a rootkit or malicious modification of a Windows registry). In this example, the malware is discarded with the VM is discarded. As a result, the malware may not be present when server computing system 12 processes another transaction. Consequently, the immediate harm from the transaction may be relatively small or non-existent. In this way, server computing system 12 may implement a security model based on discarding attacked servers rather than preventing attacks.

In general, each of VMs 20 operates within its own "sandbox." Thus, VMs 20 are unable to modify the state or data of any other one of VMs 20. Moreover, because each of VMs 20 operates within its own sandbox, VMs 20 may only be able to effect server computing system 12 in limited ways, such as by modifying data in shared database 26 or by sending messages for transmission to client computing devices 16. Furthermore, because each of VMs 20 operates within its own sandbox, the effects of a successful cyber-attack on one of VMs 20 may be limited to that VM and do not affect other parts of server computing system 12.

As part of processing transactions initiated by client computing devices 16, VMs 20 may generate messages to send to client computing devices 16. When VMs 20 generate messages to send to client computing devices 16, VMs 20 may send the messages to front-end unit 18. Front-end unit 18 may then forward the messages to appropriate ones of client computing devices 16. In this way, responses resulting from requests from clients (e.g., client computing devices 16) may be sent back from VMs 20 to the clients via front-end unit 18. In some examples, each of VMs 20 and front-end unit 18 have be assigned a different Internet Protocol (IP) address. In such examples, source IP address fields of IP packets sent by front-end unit 18 may specify the IP address of front-end unit 18. Likewise, destination IP addresses of IP packets sent by client computing devices 16 to server computing system 12 may specify the IP address assigned to front-end unit 18. Front-end unit 18 may use other information in the IP packets received by front-end unit 18 to forward the IP packets to particular ones of VMs 20.

In some examples, front-end unit 18 may store transaction responses from VMs 20 until an intrusion detection system has validated the transaction responses as benign. In this example, front-end unit 18 may only send a transaction response back to one of client computing devices 16 after the intrusion detection system has validated that the transaction response is benign. Furthermore, in one example, front-end unit 18 may duplicate requests from a client computing device and may forward the requests to a plurality of VMs. In this example, front-end unit 18 may store the results from each of the multiple VMs and compare the results for consistency before returning one of the results to the client computing device. In this example, each of the plurality of VMs may run different software (i.e., front-end unit 18 may assign the copies of the request to VMs having software diversity) such that each VM may react to a cyber-attack in a different way.

In the example of FIG. 1, shared database 26 comprises a database that is read and/or write accessible by each of VMs 20 (i.e., VMs assigned to process transactions initiated by client computing devices 16). In other words, shared database 26 may be accessible to each of the plurality of VMs 20. In general, shared database 26 may be an organized collection of data. In some examples, shared database 26 may be read and/or write accessible by software, firmware, and/or hardware other than or in addition to VMs 20.

Shared database 26 may store various types of data. For example, shared database 26 may store website data, application state data, session state data, documents, navigation data, scientific data, business data, military data, governmental data, file system data, or various other types of data. Shared database 26 may be implemented in various ways. For example, shared database 26 may comprise a relational database. In another example, shared database 26 may comprise a file system. In a third example, shared database 26 may comprise a block-level storage abstraction. Other applicable types of databases may include NoSQL databases, NewSQL databases, object-oriented databases, RDF databases, XML databases, and so on.

Shared database 26 may be persisted independently of VMs 20. Thus, shared database 26 may continue to exist and be accessible regardless of whether any of VMs 20 exist. For instance, shared database 26 may exist and may be accessible before any of VMs 20 are instantiated and after all of VMs 20 are discarded.

Furthermore, as part of processing transactions initiated by client computing devices 16, VMs 20 may generate database modification requests. The database modification requests may be requests to modify data in shared database 26. In this disclosure, a database modification request may be "associated with" a transaction when a VM generates the database modification request as part of processing the transaction. VMs 20 may generate database modification requests to modify data in shared database 26 because data written to RAM, virtual "hard disks," or other real or virtual data storage media associated with VMs 20 may be deleted (and/or become functionally inaccessible) when VMs 20 are discarded. For instance, the use of disposable VMs may assume a component to hold persistent (shared) state, such as shared database 26. Thus, the example FTN-D design of FIG. 1 may be suitable for many server applications that maintain persistent state on a backend server.

Database management system 24 may receive database modification requests from VMs 20. Furthermore, database management system 24 may perform modifications to shared database 26 in response to the database modification requests. For example, database management system 24 may receive a database modification request associated with a particular transaction. In this example, database management system 24 may perform a modification to shared database 26 in response to the database modification request associated with the respective transaction request.

In some examples, database management system 24 may implement an Application Programming Interface (API). In some such examples, VMs 20 may generate database modification requests when VMs 20 invoke particular methods of the API. Likewise, database management system 24 may receive a database modification request when database management system 24 receives an invocation of a method of the API. Thus, in some examples, the local results of client transactions processed by VMs 20 may be saved via a limited API to a persistent, shared storage component (e.g., a file system) that is integrated with a FTN-D provided by server computing system 12. In some examples, a persistent file system stored at shared database 26 may be configured to only interact with specific ones of VMs 20, and only interact in specific ways using the limited API. For instance, a Network File System (NFS) protocol may be used as an interface between VMs 20 and the persistent shared file system.

The use of shared database 26 (e.g., a shared file system) may provide for continuity of application state between transactions. For example, as part of processing a first transaction, a first VM may generate a database modification request to write a particular piece of data to shared database 26. In this example, as part of processing a second transaction, a second VM may generate a database read request to read the particular piece of data from shared database 26. In another example, server computing system 12 may host a content management system. In this example, server computing system 12 may need to save files or update a database, and if these changes were made locally inside the ephemeral VMs 20, the changes would be deleted when VMs 20 are discarded.

Some applications maintain state between transactions (e.g., either in application memory, on disk, etc.). For example, a web server may have a persistent session with a client (e.g., one of client computing devices 16). The FTN-D provided by server computing system 12 may transfer such internal application state between VM instances via shared database 26 (e.g., a persistent shared file system). In some examples, application state is flushed to the shared file system before a VM is destroyed, and read back in by applications when new VMs are instantiated. Thus, the VM may generate a database modification request as part of completing a transaction. The database modification request may request storage to shared database 26 of an application running on the VM.

In accordance with one or more examples of this disclosure, database management system 24 may implement checkpointing and rollback for shared database 26. Checkpointing is used to record a state history of shared database 26 (e.g., a persistent shared file system). The use of checkpointing may allow shared database 26 to roll back if a compromise is detected on shared database 26. Shared database 26 may be checkpointed at some interval (e.g., after each client transaction or some multiple number of client transactions) to preserve a fine-grained history of the state of shared database 26. In some examples, checkpointing may rely on a file system such as ZFS to create differential snapshots of the file system state. In such examples, the ZFS file system may be used because the ZFS file system natively supports checkpointing and rollback.

In accordance with one or more examples of this disclosure, a transaction may be determined to be associated with a cyber-attack. In some such examples, an intrusion detection system (IDS) operating on server computing system 12 or another computing system may determine that a transaction is associated with a cyber-attack. In other examples, a human may determine that a transaction is associated with a cyber-attack. In general, a transaction may be determined to be associated with a cyber-attack if the transaction constitutes (e.g., comprises) an attempt to cause server computing system 12 or another computing system to perform actions not desired by an operator of server computing system 12 (e.g., an enterprise, governmental unit, etc.).

In response to determining that a transaction is associated with a cyber-attack, database management system 24 may use checkpoint data associated with the transaction to roll back modifications to shared database 26 performed in response to database modification requests associated with the transaction. In some examples, a rollback may be automatically triggered when an unauthorized change to shared database 26 (e.g., a file system) is detected (e.g., using a file system IDS, an application-level IDS, an OS-level IDS, or by manual inspection). In some examples, the rollback may be triggered manually. In one example, shared database 26 may comprise a file system and database management system 24 may check the file system state for correctness. In this example, if the state is incorrect (e.g., because of a transaction associated with a cyber-attack), the state can be rolled back to a previous correct snapshot. In other words, the persistent shared file system can also be restored to an earlier checkpoint. In examples that use checkpointing and a persistent shared state file system, a transaction may be a unit of computation used to form discrete points for disposing of VMs and/or checkpointing a persistent shared state file system.

In many instances, IDSs have high rates of both false negatives (i.e., missed cyber-attacks) and false positives (i.e., false alarms). Furthermore, in many instances, Intrusion Prevention Systems (IPSs) have high rates of both false negatives (i.e., permitting cyber-attacks) and false positives (i.e., denying legitimate activity). An IPS may monitor network and/or system activities for malicious activity, log information about the malicious activity, attempt to block and/or stop the malicious activity, and report the malicious activity. Furthermore, the rate at which humans can identify cyber-attacks is slow. Accordingly, IDSs, IPSs, and human analysis may not be reliable for fighting through cyber-attacks. For at least this reason, the FTN-D provided by server computing system 12, in some examples, does not attempt to prevent cyber-attacks within a transaction (e.g., session). For instance, in some examples, IDSs and IPSs of server computing system 12 do not try to find or block malware while the malware is executing. Rather, server computing system 12 may run each transaction to completion and then discard the VMs on which the transactions ran. For example, if a transaction installed a rootkit on a VM, the rootkit is discarded with the VM. If the transaction modified the persistent application state on shared database 26 in some way, server computing system 12 may discover the incorrect state by application-level checks and may correct the state by rollback. Discrete points in time at which the FTN-D disposes of VMs and creates checkpoints may be determined by discrete units of interaction with remote clients that may be called "transactions." For example, server computing system 12 may generate a checkpoint in response to initiation or termination of a TCP session.

In some examples, the FTN-D provided by server computing system 12 is scaled back in order to provide reduced functionality with better performance. This disclosure may refer to such scaled back versions as "lightweight" FTN-Ds. For example, applications providing a read-only service might not need a persistent shared storage component (e.g., shared database 26). Accordingly, the persistent shared storage component, along with the checkpointing processes, the rollback processes, and any IDS or validation component, may be eliminated. In cases where database management system 24 and associated processes are eliminated, the remaining FTN-D components may integrate instead with a third-party persistent storage system, or a third-party processing system.

One example principle behind the FTN-Ds of this disclosure is similar to the concept of fault tolerance. However, faults may be independent failures, such as hardware malfunctions, and may occur without malicious intent. The response to faults may simply be to repair or replace failed components, with little likelihood of a repeated fault in the near term. Fault-tolerant systems typically use approaches such as replication and redundancy. In contrast to fault tolerant systems, FTN-Ds may be intrusion tolerant systems, a general property of which is that a successful attack on one part of a system should not affect its overall security. Intrusion tolerance may be related to fault tolerance but may be more difficult to address because intrusions may exploit systemic design vulnerabilities, and may occur with malicious intent. Fault tolerant techniques such as component replication may not protect against intrusions, because all components are susceptible to the same attack, and attacks can be repeated frequently. In fact, fault tolerant and intrusion tolerant approaches may not necessarily complement each other. For example, the common fault tolerant approach of replication may generally increase attack surface and the likelihood of compromise. Intrusion tolerance (or attack tolerance) is a type of survivability or resiliency strategy. Some existing resiliency strategies focus on mitigating denial of service (DoS) attacks at the network level to maintain service availability. In contrast to techniques that mitigate only denial of service attacks, the FTN-Ds of this disclosure may focus on mitigating host compromises, which may include a range of attacks on confidentiality, integrity, and availability. Because of this focus, FTN-Ds may be effective against more subtle security threats, such as advanced persistent threats and stealth malware. As described herein, FTN-Ds may run applications inside of VMs to isolate compromises from the host hardware and OS. Common terminology for running one or more clients inside a VM is "virtual appliance" or "browser appliance."

Figure 2:
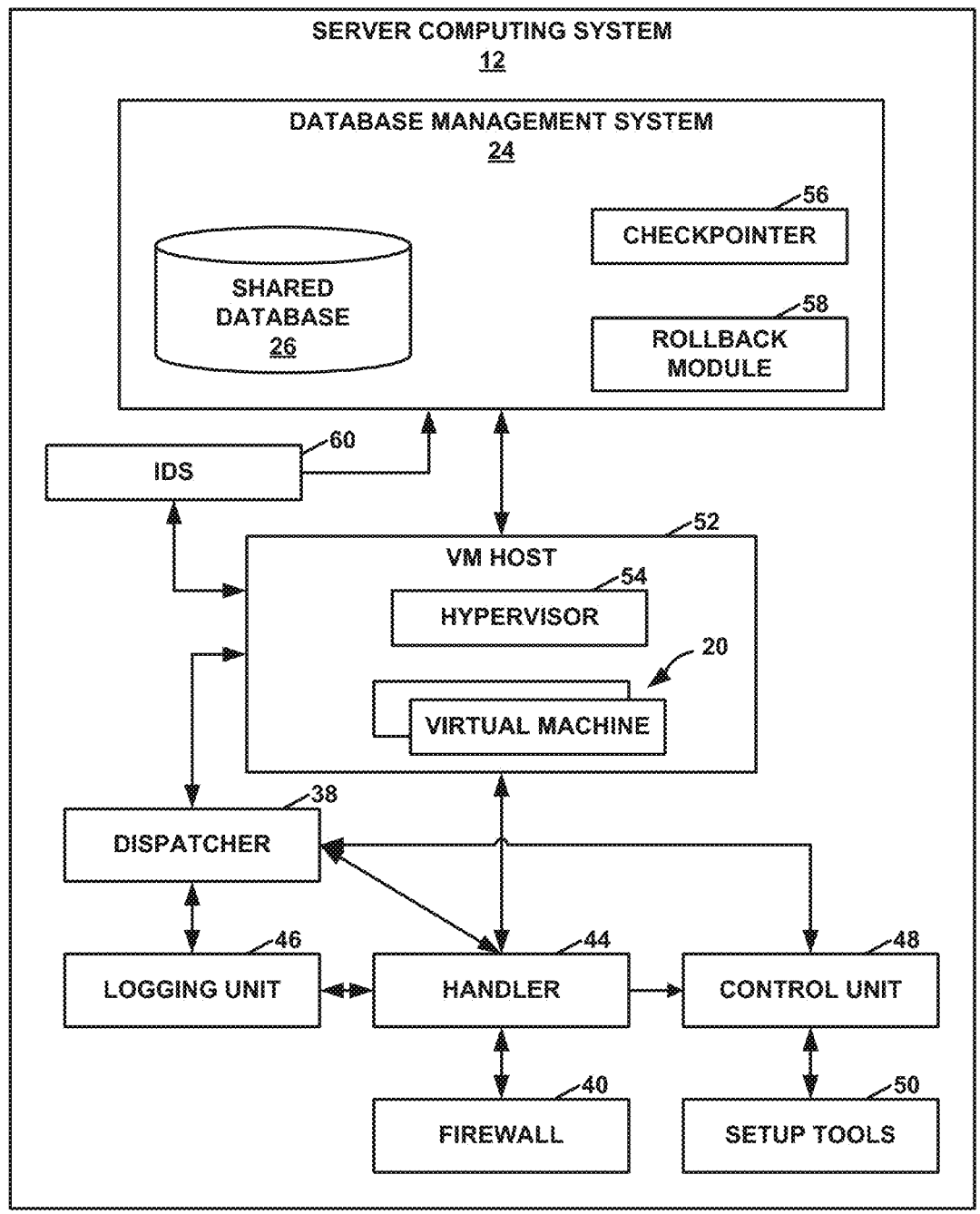
FIG. 2 is a block diagram illustrating an example server computing system, in accordance with one or more techniques of this disclosure.

FIG. 2 is a block diagram illustrating an example server computing system 12, in accordance with one or more techniques of this disclosure. In the example of FIG. 2, server computing system 12 comprises a dispatcher 38, database management system 24, a firewall 40, a handler 44, a logging unit 46, a control unit 48, setup tools 50, and a VM host 52. In some examples, front-end unit 18 (FIG. 1) includes dispatcher 38, firewall 40, handler 44, control unit 48, and setup tools 50. In other examples, server computing system 12 may include more, fewer, or different components.

Firewall 40 may receive data from a network (e.g., network 14). Firewall 40 forwards data that satisfy particular criteria (e.g., data specifying particular port numbers, data specifying particular protocol identifiers, etc.). Firewall 40 does not forward received data that do not satisfy the particular criteria. Handler 44 may receive specific types of data forwarded by firewall 40. For example, handler 44 may receive TCP data forwarded by firewall 40. In another example, handler 44 may receive HTTP data forwarded by firewall 40. When handler 44 receives a data, handler 44 may provide the same or different data to logging unit 46. Logging unit 46 may process and/or store data in order to log data received by handler 44. In addition, handler 44 may forward messages (e.g., TCP messages) to dispatcher 38.

In the example of FIG. 2, VM host 52 comprises a hypervisor 54 and VMs 20. Hypervisor 54 may create and run VMs 20. Hypervisor 54 may be a Type 1 or a Type 2 hypervisor. In other examples, VM host 52 may comprise multiple hypervisors and VMs 20 may run on different ones of the hypervisors of VM host 52. Each of VMs 20 may be a disposable VM in that each of VMs 20 may be discarded after a transaction assigned to the VM is complete.

Dispatcher 38 may identify transactions associated with the messages received from handler 44. In addition, dispatcher 38 may interact with VM host 52 to assign transactions to VMs 20. In some examples, dispatcher 38 may send requests to hypervisor 54 to instantiate a new VM. In other examples, dispatcher 38 may select a VM from a pool of fresh VMs previously instantiated by hypervisor 54. Furthermore, when dispatcher 38 assigns a transaction to a VM, dispatcher 38 may instruct handler 44 to forward messages associated with the transaction to the VM assigned to the transaction. Logging unit 46 may log data provided by dispatcher 38 (and/or data based on data provided by dispatcher 38).

Control unit 48 may provide a user interface for configuration and control of server computing system 12. In some examples, the user interface is a local or remote graphical user interface (GUI), a command line interface, or another type of interface. Logging unit 46 may log data provided by control unit 48 (and/or data based on data provided by control unit 48). Setup tools 50 may comprise tools for configuring server computing system 12. For example, setup tools 50 may include an FTN-D installer application, a VM deployment tool, and so on. In this example, the VM deployment tool may include tools for service and appliance configuration, tools for operating system configuration, tools for platform configuration, and/or other types of tools.

In the example of FIG. 2, database management system 24 comprises shared database 26, a checkpointer 56, and a rollback module 58. In some examples, when database management system 24 receives a database modification request from one of VMs 20, database management system 24 may apply changes indicated by the database modification request to shared database 26. Furthermore, when database management system 24 receives a database modification request from one of VMs 20, checkpointer 56 may generate checkpoint data. Rollback module 58 may use the checkpoint data to roll back changes to shared database 26.

Furthermore, in the example of FIG. 2, server computing system 12 includes an IDS 60. IDS 60 may analyze data to determine whether a transaction is associated with a cyber-attack. For example, IDS 60 may analyze configuration states of VMs 20 to determine whether a transaction has caused a VM to enter a state that is known to be associated with a cyber-attack. In some examples, IDS 60 may analyze requests from VMs 20 to read and/or modify shared database 26. Furthermore, in some examples, IDS 60 may analyze messages generated by VMs 20 for output by server computing system 12 to client computing devices (e.g., client computing devices 16). In some examples, IDS 60 may analyze the state of shared database 26 to determine whether one or more transactions are associated with one or more cyber-attacks or whether shared database 26 is in a compromised state. In some examples, when IDS 60 determines that a transaction is associated with a cyber-attack, IDS 60 may instruct rollback module 58 to roll back changes to shared database 26 associated with the transaction.

Thus, in the example of FIG. 2, server computing system 12 may be a network node comprising a hardware-based processing system having a set of one or more processing units, a plurality of VMs executing on the one or more processing units, a dispatcher that receives, from one or more client computing devices, a plurality of messages associated with transactions, assigns each of the transactions to the plurality of virtual machines, and discards each of the VMs when the transactions assigned to the VMs are complete. Furthermore, server computing system 12 may comprise one or more intrusion detection systems that detect whether any of the VMs or the shared database has been compromised. In addition, server computing system 12 may comprise a checkpointing module that generates checkpoint data based on requests from the VMs to modify a shared database. Server computing system 12 may also comprise a rollback module that uses the checkpoint data to roll back modifications to the shared database that are associated with a particular transaction when the one or more intrusion detection systems determine that a VM to which the particular transaction was assigned has been compromised, or that the shared database has been compromised.

Figure 3:
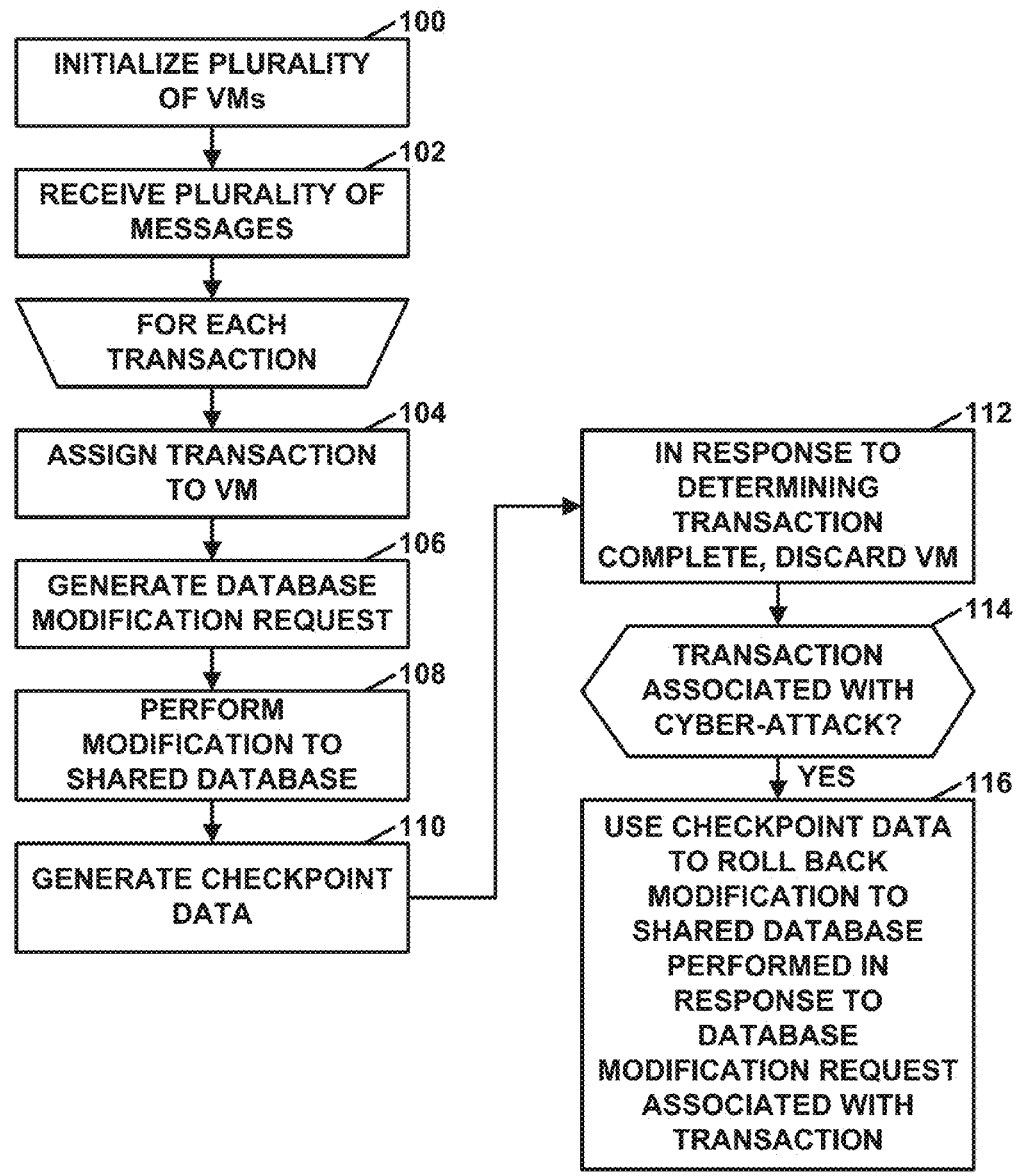
FIG. 3 is a flowchart illustrating an example operation of a server computing system, in accordance with one or more techniques of this disclosure.

FIG. 3 is a flowchart illustrating an example operation of server computing system 12, in accordance with one or more techniques of this disclosure. In the example of FIG. 3, server computing system 12 may initialize a plurality of virtual machines that execute on one or more computing devices of server computing system 12 (100). In addition, server computing system 12 may receive a plurality of messages from one or more client computing devices (102). Each of the plurality of messages may correspond to a transaction in a plurality of transactions. Although the example of FIG. 3 shows server computing system 12 as initializing the plurality of VMs prior to receiving the plurality of messages, in other examples, server computing system 12 may initialize each VM in the plurality of VMs in response to receiving a message that corresponds to a new transaction.

Server computing system 12 may perform the following actions of FIG. 3 for each respective transaction in the plurality of transactions. Particularly, server computing system 12 may assign the respective transaction to a respective VM from the plurality of VMs (104). The respective transaction may be the first transaction assigned to the respective virtual machine. Furthermore, the respective VM may generate, as part of the respective VM processing the respective transaction, a database modification request associated with the respective transaction (106). Server computing system 12 (e.g., database management system 24) may perform a modification to a shared database (e.g., shared database 26) in response to the database modification request associated with the respective transaction (108). In this way, the respective VM may record operational state data to shared database 26 resultant from the processing of the transaction. The shared database is persisted independently of the plurality of VMs. Furthermore, server computing system 12 may generate checkpoint data associated with the respective transaction (110). In some examples, server computing system 12 may generate the checkpoint data associated with the respective transaction in response to the database modification request associated with the respective transaction. In other examples, server computing system 12 may generate the checkpoint data associated with the respective transaction in response to determining that a number of database modification requests associated with the respective transaction exceeds a threshold (e.g., 2, 3, 4, etc.).

In response to determining that processing of the respective transaction is complete, server computing system 12 may discard the respective virtual machine (112). In some examples, server computing system 12 may generate the database modification request as part of completing the transaction. Furthermore, in some examples, the database modification request may request storage to shared database 26 of an application state of an application running on the respective virtual machine. In such examples, server computing system 12 may initialize a particular virtual machine such that an instance of the application running on the particular virtual machine has the application state. In some such examples, the application is a server (e.g., web server, an FTP server, an email server, etc.) that provides a network service.

In addition, server computing system 12 may determine whether the respective transaction is associated with a cyber-attack (114). In other examples, a human or another computing system may determine that the respective transaction is associated with a cyber-attack. Furthermore, in some examples, server computing system 12 may determine that the respective transaction is associated with a cyber-attack in response to determining that the respective transaction attempted to perform an unauthorized modification of programming code of the VM or an unauthorized modification of a configuration of the VM. In another example, server computing system 12 may determine that the respective transaction is associated with a cyber-attack in response to determining that the respective transaction is associated with an unauthorized request to access or modify data in shared database 26. In response to determining that the respective transaction is associated with a cyber-attack (YES of 114), server computing system 12 may use the checkpoint data associated with the respective transaction to roll back the modification to shared database 26 performed in response to the database modification request associated with the respective transaction (116).

Figure 4:
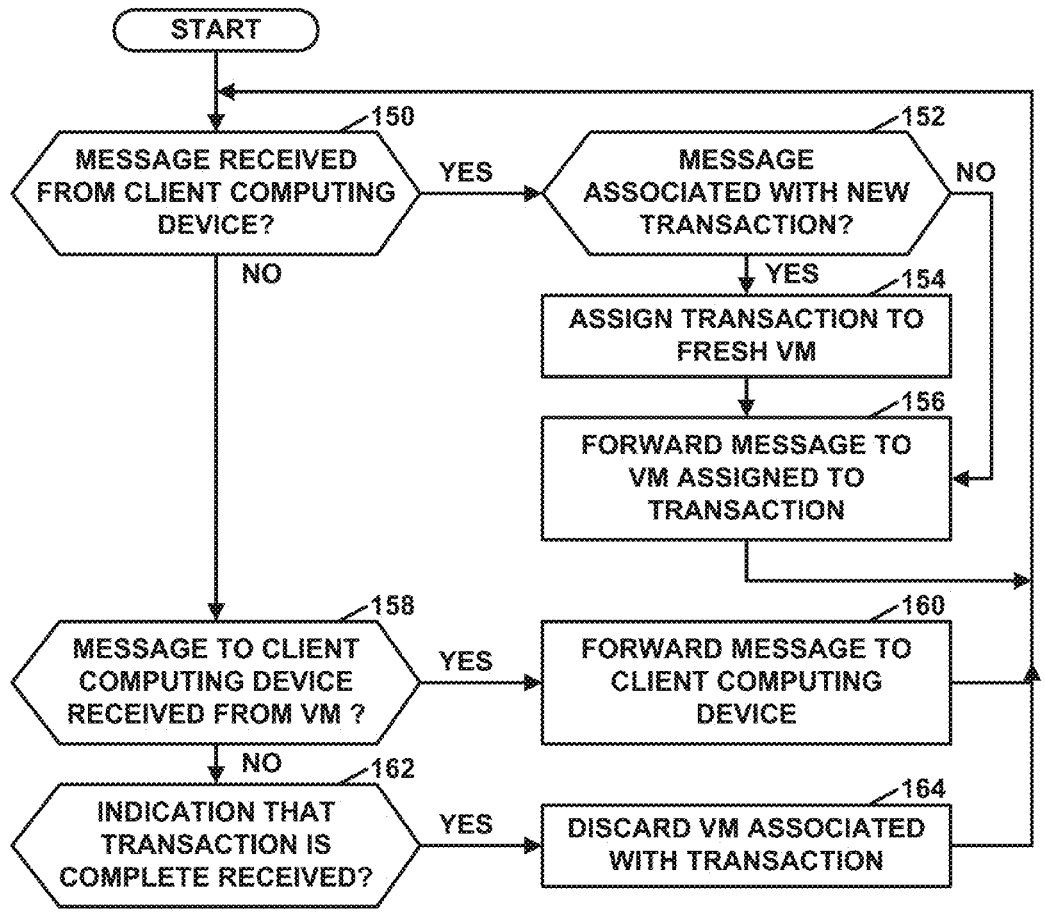
FIG. 4 is a flowchart illustrating an example operation of a front-end unit, in accordance with one or more techniques of this disclosure.

FIG. 4 is a flowchart illustrating an example operation of front-end unit 18, in accordance with one or more techniques of this disclosure. In the example of FIG. 4, front-end unit 18 may determine whether a message has been received from a client computing device (e.g., one of client computing devices 16) (150). In response to determining that a message has been received from a client computing device ("YES" of 150), front-end unit 18 may determine whether the message is associated with a new transaction (152). In response to determining that the message is associated with a new transaction ("YES" of 152), front-end unit 18 may assign the transaction to a fresh VM (154). In some examples, front-end unit 18 may instantiate (e.g., initialize) the VM as part of assigning the transaction to the VM. In other examples, front-end unit 18 may select the VM from a pool of previously initialized fresh VMs as part of assigning the transaction to the VM. After assigning the transaction to the VM or in response to determining that the message is not associated with a new transaction ("NO" of 152), front-end unit 18 may forward the message to the VM assigned to the transaction associated with the message (156).

Otherwise, front-end unit 18 may determine whether a message to a client computing device has been received from a VM (158). In response to determining that a message to a client computing device has been received from a VM ("YES" of 158), front-end unit 18 may forward the message to the client computing device (160).

Furthermore, front-end unit 18 may determine whether an indication that a transaction is complete has been received (162). In response to determining that front-end unit 18 has received an indication that a transaction is complete ("YES" of 162), front-end unit 18 may discard a VM associated with the transaction (164).

Figure 5:
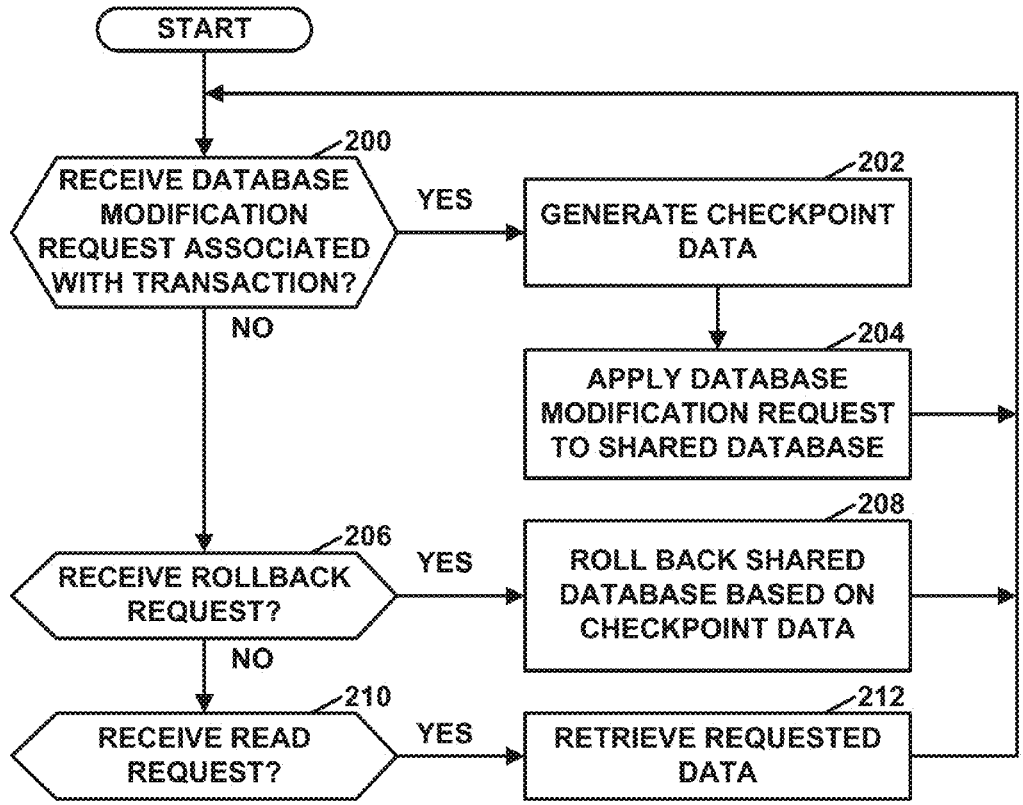
FIG. 5 is a flowchart illustrating an example operation of a database management system, in accordance with one or more techniques of this disclosure.

FIG. 5 is a flowchart illustrating an example operation of database management system 24, in accordance with one or more techniques of this disclosure. In the example of FIG. 5, database management system 24 may determine whether database management system 24 has received a database modification request associated with a transaction (200). In response to determining that database management system 24 has received a database modification request associated with a transaction ("YES" of 200), database management system 24 may generate checkpoint data associated with the transaction (202). In addition, database management system 24 may apply the database modification request to shared database 26 (204).

Otherwise, database management system 24 may determine whether database management system 24 has received a rollback request (206). Database management system 24 may receive a rollback request when a transaction has been determined to be associated with a cyber-attack. In response to receiving a rollback request ("YES" of 206), database management system 24 may roll back shared database 26 based on the checkpoint data (208).

Furthermore, database management database 24 may determine whether database management system 24 has received a read request (210). In response to determining that database management system 24 has received a read request ("YES" of 210), database management system 24 may retrieve, from shared database 26, data requested by the read request (212).

Figure 6:
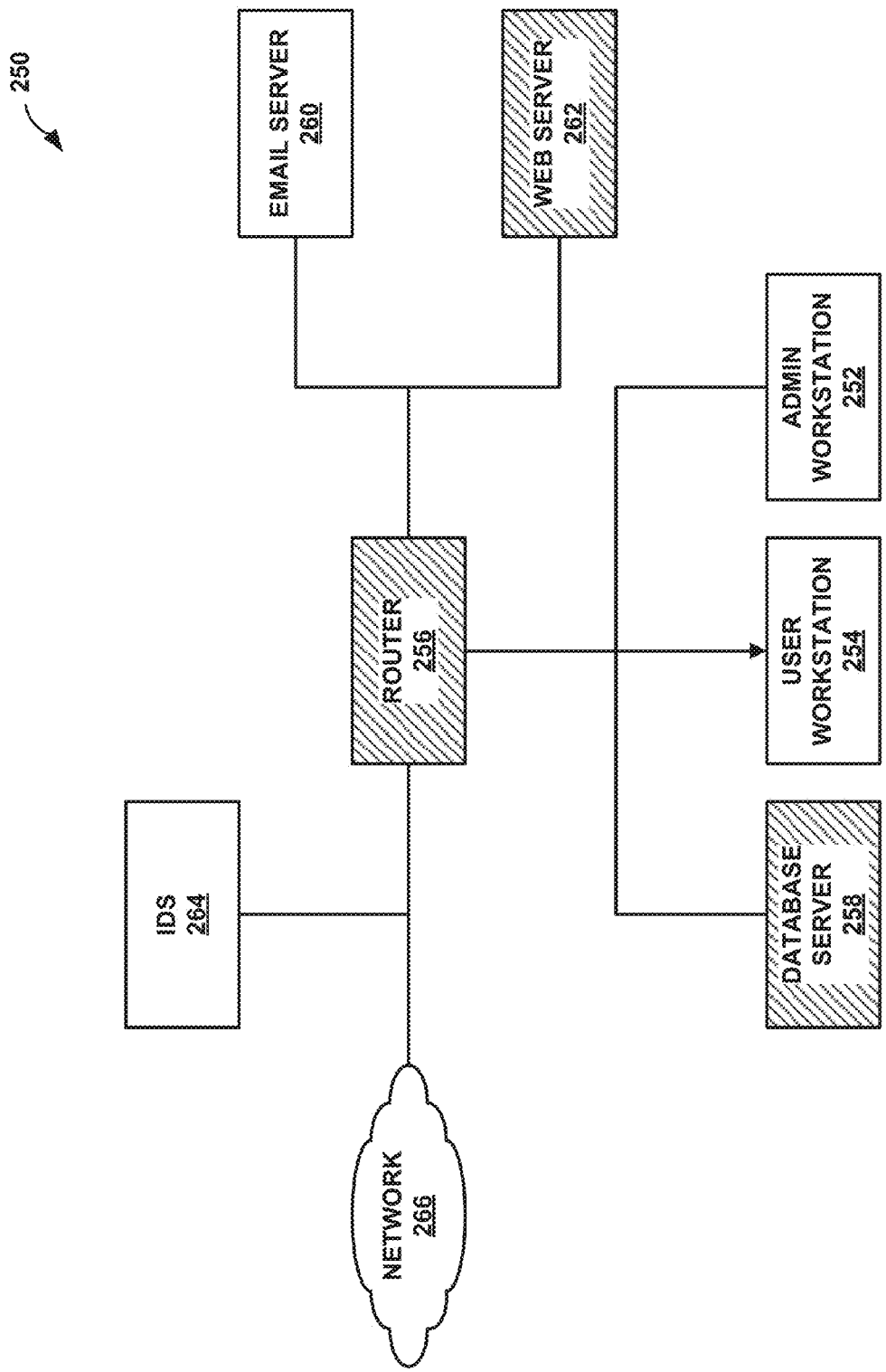
FIG. 6 is a conceptual diagram illustrating an example network that includes fight-through nodes, in accordance with one or more techniques of this disclosure.

FIG. 6 is a conceptual diagram illustrating an example network that includes fight-through nodes, in accordance with one or more techniques of this disclosure. In the example of FIG. 6, each box represents a node of a network 250 and lines indicate physical and/or wireless communication channels between nodes. Network 250 may be an enterprise network, a data center network, or another type of network. In the example of FIG. 6, the nodes of network 250 include an administrator workstation 252, a user workstation 254, a router 256, a database server 258, an email server 260, a web server 262, an IDS 264, and may include other nodes. Router 256 and IDS 264 may receive data from a network 266 (e.g., the Internet). Moreover, router 256 may send data on network 266. Furthermore, in the example of FIG. 6, router 256, database server 258, and web server 262 may be FTN-Ds. In other examples, other nodes of network 250 or other networks may be FTN-Ds. Although the techniques of this disclosure have been described herein as being performed on a "server computing system," the techniques of this disclosure are not so limited. Rather, other types of computing systems may be (or may provide) FTN-Ds.

Figure 7:
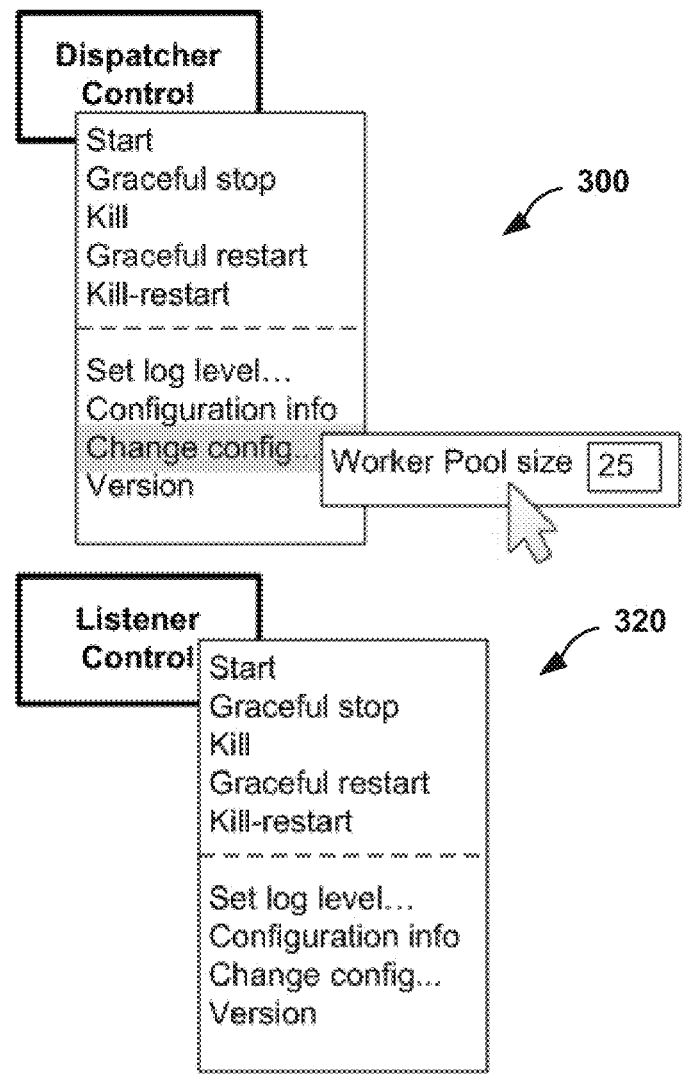
FIG. 7 is a conceptual diagram illustrating an example dispatcher control interface and an example listener control interface, in accordance with one or more techniques of this disclosure.

FIG. 7 is a conceptual diagram illustrating an example dispatcher control interface 300 and an example listener control interface 320, in accordance with one or more techniques of this disclosure. Dispatcher control interface 300 may enable a user to interact with dispatcher 38 (FIG. 2). Listener control interface 320 may enable a user to interact with a listener (e.g., handler 44 of FIG. 2).

In the example of FIG. 7, dispatcher control interface 300 includes menu items "Start," "Graceful stop," "Kill," "Graceful restart," "Kill-restart," "Set log level . . . ," "Configuration info," "Change config . . . ," and "Version." The menu items "Start," "Graceful stop," "Kill," "Graceful restart," and "Kill-restart" may enable a user to start, stop, and/or restart dispatcher 38. The menu item "Set log level . . . " may enable the user to set a level with which dispatcher 38 logs information. The menu items "Configuration info" and "Version" may enable the user to view various configuration and version information about dispatcher 38. The menu item "Change config . . . " may enable the user to change various aspects of dispatcher 38. For instance, in the example of FIG. 7, a field that enables the user to change the worker pool size (i.e., the number of VMs to which dispatcher 38 assigns transactions) may be displayed when the user selects the menu item "Change config . . . ."

Furthermore, in the example of FIG. 7, listener control interface 320 includes menu items similar to those of dispatcher control interface 300. However, in the example of FIG. 7, selection of the menu item "Change config" in listener control interface 320 does not cause a computing device to display a field that enables the user to change the worker pool size.

FIG. 8 is a conceptual diagram illustrating an example transaction and worker details table 340, in accordance with one or more techniques of this disclosure. In the example of FIG. 8, table 340 displays a current state of server computing system 12. Particularly, table 340 includes a separate row for each separate transaction. Furthermore, table 340 includes a transaction ID field, a client IP field, a duration field, a traffic in/out field, a worker id field, a memory percentage field, and a central processing unit (CPU) percentage field for each of the transactions. Table 340 may be sorted based on each of the columns. Furthermore, in some examples, each column of table 340 may be repositionable.

In the example of FIG. 8, a computing device may output, for display, a contextual menu 342 when the computing device receives an indication of user input to select an entry in table 340. Contextual menu 342 may include menu items that enable the user to manage a transaction and/or a worker (i.e., a VM instance) assigned to the transaction.

FIG. 9 is a conceptual diagram illustrating an example global statistics table 360, in accordance with one or more techniques of this disclosure. Global statistics table 360 displays information about the performance and activity of server computing system 12. In the example of FIG. 9, global statistics table 360 includes a quantity of transactions field, a traffic in field, a traffic out field, a worker usage percentage field, a worker startup time field, a worker refresh time field. The fields of global statistics table 360 may be computed for various time periods, such as since startup or for the current month, week, day, hour, or minute.

Figure 10:
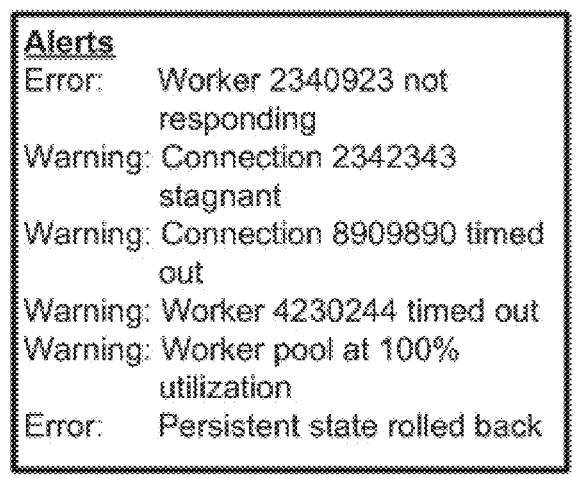
FIG. 10 is a conceptual diagram illustrating an example alerts interface, in accordance with one or more techniques of this disclosure.

FIG. 10 is a conceptual diagram illustrating an example alerts interface 380, in accordance with one or more techniques of this disclosure. Server computing system 12 may output an alerts interface (such as alerts interface 380) to alert a user (e.g., a system administrator) to various types of information, such as errors and warnings. For instance, in the example of FIG. 10, alerts interface 380 may alert a user to the fact that an error occurred because "Worker 2340923" is not responding.

In some examples, server computing system 12 may refresh a VM (e.g., one of VMs 20) responsive to receiving an indication of user input. In this way, server computing system 12 may implement manual triggers for refreshing VMs 20. Refreshing a VM may involve discarding the VM and, in some instances, assigning one or more transactions previously assigned to the VM to a fresh VM. In other instances, refreshing a VM may simply involve discarding the current VM. In some examples, the indication of a user input to refresh a VM may comprise an indication that a user has pressed a virtual or physical button of a user interface. In this way, a lifetime of a resource (e.g. a VM) may be tied to user interface controls or other manual inputs. In this disclosure, the "lifetime" of a resource, such as a VM, may start when the resource is initialized and end when the resource is discarded.

Thus, in some examples, a computing system (e.g., server computing system 12) may initialize, from one or more common templates, a virtual machine that executes on one or more computing devices of the computing system. Responsive to an occurrence of an initiation condition of a transaction, the computing system may assign the transaction to the virtual machine. The virtual machine may generate, as part of the virtual machine processing the transaction, a database modification request associated with the transaction. Responsive to the database modification request associated with the transaction, the computing system may perform a modification to a shared database (e.g., shared database 26) that is persisted independently of the virtual machine. Additionally, the computing system may generate checkpoint data associated with the transaction. Responsive to a manual trigger, the computing system may discard the virtual machine. Furthermore, responsive to a rollback request, the computing system may use the checkpoint data associated with the transaction to roll back the modification to the shared database performed responsive to the database modification request associated with the transaction.

In some examples, server computing system 12 may refresh a VM in response to automatic triggers. The automatic triggers may comprise a set of rules. For example, server computing system 12 may automatically refresh a VM in response to an intrusion detection system detecting the occurrence of an intrusion or other type of cyber-attack.

Thus, the VM can be automatically refreshed to a safe state in response to the intrusion detection system detecting the occurrence of an intrusion. In another example, server computing system 12 may refresh a VM at the termination of a transaction assigned to the VM if the transaction is associated with a first class of user, but does not refresh the VM if the transaction is associated with a second class of user. In another example, server computing system 12 may refresh a VM at the termination of a transaction assigned to the VM if particular actions occurred while processing the transaction, but does not refresh the VM if the particular actions did not occur while processing the transaction. In another example, server computing system 12 may refresh a VM at the termination of a transaction assigned to the VM if the transaction belonged to a first type of transaction, but does not refresh the VM if the transaction belongs to a second type of transaction.

Thus, in some examples, a computing system (e.g., server computing system 12) may initialize, from one or more common templates, a virtual machine that executes on one or more computing devices of the computing system. Responsive to an occurrence of an initiation condition of a transaction, the computing system may assign the transaction to the virtual machine. The virtual machine may generate, as part of the virtual machine processing the transaction, a database modification request associated with the transaction. Responsive to the database modification request associated with the transaction, the computing system may perform a modification to a shared database (e.g., shared database 26) that is persisted independently of the virtual machine. Additionally, the computing system may generate checkpoint data associated with the transaction. Responsive to an automatic trigger, the computing system may discard the virtual machine. Furthermore, responsive to a rollback request, the computing system may use the checkpoint data associated with the transaction to roll back the modification to the shared database performed responsive to the database modification request associated with the transaction.

Software implementing a FTN-D (i.e., FTN-D software) may run multiple copies of software that fulfill the same purpose. For example, a desktop machine may run two copies of an operating system. In another example, a server may run fifty identical copies of server software. In some such examples, a dispatcher may take inputs and distribute the inputs to different virtualized systems. On a desktop computer, such inputs may include inputs from a keyboard, a mouse, and a monitor. Dispatcher 38 may distribute such inputs to one VM running on the desktop computer, while leaving one or more additional VMs running on the desktop computer in quiescent states. On a network server, such inputs may include network connections and/or data received from client devices. Each TCP session may be directed to a separate VM running on the network server. In this way, each TCP session may be isolated from each other TCP session. Furthermore, in this way, the dispatcher (e.g., dispatcher 38) may perform multiplexing from the outside world to the pool of resources in the inside world. Especially for network servers, this information may be used in the resource lifetime strategies. Each TCP session may be assigned a separate VM. When the TCP session ends, the VM to which the TCP session is assigned is reset (e.g., discarded and replaced with a freshly initialized VM).

In various examples described elsewhere in this disclosure, server computing system 12 may assign only a single transaction to a VM and may discard the VM after the transaction is complete. However, in accordance with one or more additional examples of this disclosure, server computing system 12 may assign multiple transactions to a single VM and may discard the VM after all of the transactions assigned to the VM are complete. For example, in some example implementations, server computing system 12 may refresh a given VM only after a configurable number of transactions have been completed by the VM. In other words, server computing system 12 may operate in accordance with a VM refresh rate, such as completions of every N transactions. Moreover, server computing system 12 may dynamically control the VM refresh rate N based on a number of factors, such as a current threat level specified by IDS 60. For example, dispatcher 38 of server computing system 12 may initially operate in accordance with a VM refresh rate of 10 transactions, where 10 is configured by rule or policy. Further, in accordance with defined rules, dispatcher 38 may reduce the VM refresh rate, such as to a VM refresh rate of every 5 transactions, in response to an IDS detecting a potential network attack associated with the computing system or another node within the network. Moreover, based on the rules, dispatcher 38 may apply a strict refresh rate on a single transaction basis upon confirming an actual network attack on server computing system. In this way, dispatcher 38 may provide dynamic, real-time control of a VM refresh rate in response to rule-driven factors.

Thus, in some examples, a computing system (e.g., server computing system 12) may initialize, from one or more common templates, a virtual machine that executes on one or more computing devices of the computing system. Responsive to an occurrence of an initiation condition of a transaction, the computing system may assign the transaction to the virtual machine. The computing system may also assign one or more additional transactions to the virtual machine. The virtual machine may generate, as part of the virtual machine processing the transaction, a database modification request associated with the transaction. Responsive to the database modification request associated with the transaction, the computing system may perform a modification to a shared database (e.g., shared database 26) that is persisted independently of the virtual machine. Additionally, the computing system may generate checkpoint data associated with the transaction. Responsive to a manual or automatic trigger, the computing system may discard the virtual machine. For instance, the computing system may, responsive to completion of each of the one or more transactions assigned to the virtual machine, discard the virtual machine. Furthermore, responsive to a rollback request, the computing system may use the checkpoint data associated with the transaction to roll back the modification to the shared database performed responsive to the database modification request associated with the transaction. Thus, in some examples, the computing system may determine whether multiple transactions are allowed to be assigned to the virtual machine when a transaction is already assigned to the virtual machine. In such examples, the computing system may assign another transaction to the virtual machine when multiple transactions are allowed to be assigned to the virtual machine.

As another example, server computing system 12 may assign multiple TCP sessions to a single VM. In this example, server computing system 12 may assign multiple TCP sessions to a single VM if the multiple TCP sessions have the same origin (e.g., source IP address). For instance, it may be common that a web browser application running on a client device initiates multiple TCP sessions to server computing system 12 to access various parts of a web page (e.g., text, pictures, etc.). Server computing system 12 may assign each of these TCP sessions to the same VM.

In some examples where multiple transactions are assigned to the same VM, the multiple transactions may be considered to be "bundled" together such that the multiple transactions conceptually form a single "bundled" transaction. Server computing system 12 may, in accordance with defined rules, discard the VM only when the whole "bundled" transaction is complete. Assigning multiple transactions to a single VM may conserve computational resources associated with initiating and managing the multiple VMs to which the transaction would otherwise be assigned. Thus, in some examples, a computing system (e.g., server computing system 12) may determine, based on computing resources of the computing system, a maximum number of transactions the computing system assigns to a virtual machine. The computing resources may include memory availability, processing resources, storage availability, I/O capabilities, and so on. Moreover, in response to other automated triggers, such as detection of a potential attack or other high threat level, dispatcher 38 may modify its operation so as to assign each TCP session to its own VM, and may transition back to bundling multiple TCP sessions as a "transaction" to be executed or otherwise processed on a common VM responsive to a reduced threat level.

Server computing system 12 may implement one or more rules that control how many transactions server computing system 12 can assign to a single VM prior to server computing system 12 discarding the VM. In some examples, these rules change based on a defensive posture or other system parameters. For example, at times when there is elevated concern about cyber-attack, server computing system 12 may assign fewer transactions to a VM prior to discarding the VM. In this example, at other times, server computing system 12 may assign more transactions to a VM prior to discarding the VM. Assigning fewer transactions to a VM prior to discarding the VM may increase security. Assigning more transactions to a VM prior to discarding the VM may increase responsiveness of server computing system 12 and/or may conserve computational resources of server computing system 12. Thus, in some examples, a computing system (e.g., server computing system 12) may determine, based on a defensive posture of the computing system, a maximum number of transactions that the computing system assigns to a virtual machine.

In various examples, server computing system 12 may determine, based on various factors, whether to assign multiple transactions to a single VM. For instance, in one example, server computing system 12 may determine, based on an identity of a user associated with a transaction, whether to assign the transaction to a VM to which server computing system 12 has already assigned one or more transactions. Thus, in some examples, a computing system (e.g., server computing system 12) may determine, based on an identity of a user associated with the at least one transaction assigned to a virtual machine, a maximum number of transactions that the computing system assigns to the virtual machine. In some examples, a computing system (e.g., server computing system 12) may determine, based on a type of transaction assigned to the virtual machine, a maximum number of transactions that the computing system assigns to the virtual machine.

As described elsewhere in this disclosure, a transaction may correspond to a session of a communication protocol, such as TCP. However, some communication protocols do not include the notion of a session. In other words, such communication protocols are sessionless communication protocols. For example, the User Datagram Protocol (UDP) is a sessionless communication protocol. To accommodate sessionless communication protocols, server computing system 12 may determine the start and completion of a transaction based on factors other than the start and completion of a session. For example, server computing device 12 may determine the start of a transaction upon receiving one or more packets from a distinct source (e.g., a distinct IP address). In this example, server computing device 12 may determine the completion of the transaction when a terminating event occurs. In some examples, the terminating event is a determination that a particular amount of time has passed following a most recent time that server computing system 12 has received data from the source. Furthermore, in some examples, transactions can be defined as application level sessions.

Thus, in some examples, a transaction comprises a stream of data from a source. An initiation condition of the transaction may comprise receiving the stream of data from the source. In some instances, the stream of data from the source comprises a stream of UDP data. Furthermore, in some such examples, an automatic trigger for discarding a VM is an elapsing of a particular amount of time following receiving a last unit of data from the source. In other examples, the automatic trigger is an indication of a termination of an application level session.

As indicated elsewhere in this disclosure, server computing device 12 may assign transactions to VMs 20. In accordance with some examples of this disclosure, server computing system 12 may categorize transactions into a plurality of classes. For example, server computing system 12 may categorize transactions into a "trusted" class and an "untrusted class." In various examples, server computing device 12 may determine the class into which to categorize a transaction based on various factors. For example, server computing device 12 may categorize a given transaction based on a security level or role associated with the user that originated the transaction. As another example, server computing device 12 may determine, based on a sub-net of an IP address of a client device associated with a transaction, that the transaction belongs to a particular class. For instance, in this example, if the IP address of the client device associated with the transaction belongs to a sub-net of IP addresses associated with a particular organization or set of users, server computing system 12 may determine that the transaction belongs to the "trusted" class. Otherwise, in this example, if the IP address of the client device associated with the transaction does not belong to the sub-net of IP addresses associated with the particular organization or user, server computing system 12 may determine that the transaction belongs to the "untrusted" class.

Server computing device 12 may assign transactions belonging to different classes to VMs that are subject to different refresh policies (e.g., lifetime strategies). For example, server computing device 12 may assign transactions belonging to a first class to VMs that are subject to a first refresh policy and may assign transactions belonging to a second class to VMs that are subject to a second, different refresh policy. The refresh policies of VMs may dictate the circumstances under which server computing system 12 refreshes VMs (e.g., discards and, in some examples, replaces VMs with fresh VMs). Some groups of VMs 20 may be associated with more or less aggressive refresh policies than other groups of VMs 20. For example, server computing system 12 does not discard a VM subject to a first refresh policy upon completion of any transaction assigned to the respective VM. Rather, server computing device 12 may assign multiple transactions to a VM subject to the first refresh policy. In some instances, the multiple transactions assigned to a VM subject to the first refresh policy may correspond to different users, client devices, and/or IP addresses. Server computing system 12 may conserve computing resources by assigning multiple transactions to the same VM. Furthermore, in this example, server computing system 12 may discard a VM subject to a second, more aggressive refresh policy upon completion of any transaction assigned to the VM. In this example, server computing device 12 may assign transactions belonging to a "trusted" class to VMs subject to the first refresh policy and may assign transactions belonging to an "untrusted" class to VMs subject to the second refresh policy. This may result in increased performance for transactions in the "trusted" class and increased security with regard to transactions in the "untrusted" class. Thus, in some examples, a computing system (e.g., server computing system 12) may determine, based on a type of transaction assigned to the virtual machine, a maximum number of transactions that the computing system assigns to the virtual machine.

Thus, in some examples, a computing system (e.g., server computing system 12) may assign transactions belonging to a class to virtual machines from a plurality of virtual machines that are subject to a first refresh policy. The computing system may assign transactions belonging to a second, different class to virtual machines from the plurality of virtual machines that are subject to a second, different refresh policy. The plurality of virtual machines may generate, as part of the virtual machines processing the transactions belonging to the first class and the transactions belonging to the second class, database modification requests associated with the transactions belonging to the first class and the transactions belonging to the second class. The computing system may perform modifications to a shared database (e.g., shared database 26) responsive to the database modification requests. The shared database is persisted independently of the plurality of virtual machines. The computing system may generate checkpoint data associated with the transactions belonging to the first class and the transactions belonging to the second class. The computing system may discard, according to the first refresh policy, the virtual machines subject to the first refresh policy. The computing system may discard, according to the second refresh policy, the virtual machines subject to the second refresh policy. Responsive to determining that a particular transaction is associated with a cyber-attack, the computing system may use checkpoint data associated with the particular transaction to roll back the modification to the shared database performed responsive to a database modification request associated with the particular transaction, wherein the particular transaction is among the transactions belonging to the first class or the transactions belonging to the second class. For instance, in such examples, the computing system may discard each respective virtual machine of the virtual machines subject to the first refresh policy after the respective virtual machine has completed processing a first number of transactions. Similarly, in such examples, the computing system may discard each respective virtual machine of the virtual machines subject to the second refresh policy after the respective virtual machine has completed processing a second number of transactions (e.g., 1), wherein the first number of transactions is greater than the second number of transactions.

In some examples, server computing system 12 may determine, based on one or more factors, whether to assign multiple transactions to a single VM. For instance, in one example, server computing system 12 may determine, based on available computing resources, whether to assign multiple transactions to a single VM. In this example, if sufficient computing resources are available, server computing system 12 assigns each respective transaction to a different VM that is discarded upon completion of the respective transaction. In this example, if there are insufficient computing resources to do so, server computing system 12 assigns up to two transactions to a VM and server computing system 12 discards the VM after the VM has completed both of the transactions. If there are still insufficient computing resources, server computing system 12 may assign up to three transactions to a VM and server computing system 12 may discard the VM after the VM has completed all three transactions, and so on. In this way or other ways, server computing system 12 may discard VMs as frequently as possible given available computing resources.

In some instances, one or more of VMs 20 may become non-operational. For instance, a VM may "crash" or "hang." A VM that is non-operational may be non-responsive to input and/or may fail to generate appropriate output. However, a VM that is non-operational may continue to consume system resources, such as memory space and processor cycles.

In accordance with one or more techniques of this disclosure, server computing system 12 may implement one or more mechanisms for discarding and potentially restarting VMs that have become non-operational. For example, dispatcher 38 of server computing system 12 may implement a respective timer (e.g., a "watchdog timer") for each respective VM of VMs 20. Responsive to the expiration of the timer for a VM, dispatcher 38 may determine whether the VM is non-operational. If the VM remains operational, the VM, or dispatcher 38 in response to a message from the VM, may reset the respective timer for the VM. In various examples, server computing system 12 may determine whether the VM is non-operational in various ways. For example, server computing system 12 may poll or "ping" the VM to determine whether the VM is responsive. In other words, server computing system 12 may probe the VM to determine whether the VM has become non-operational. In another example, if a web server application runs on the VM, server computing system 12 may request a web page from the web server application. In this example, if server computing system 12 does not receive appropriate data associated with the web page from the VM, server computing system 12 may determine that the VM has become non-operational.

Responsive to determining that a VM has become non-operational, server computing system 12 may discard the VM. In other words, an automatic trigger for discarding a VM is a determination by a computing system (e.g., server computing system 12) that the VM has become non-operational. Furthermore, in some examples, server computing system 12 may use checkpoint data associated with one or more of the transactions processed by the VM to rollback modifications of shared database 26 associated with the one or more transactions processed by the VM. In some instances, the VM may have become non-operational because of an attack directed at the VM or server computing system 12 generally. Rolling back the modifications to shared database 26 may potentially prevent data associated with the attack from remaining in shared database 26.

In some examples, if a transaction assigned to the VM that has become non-operational is not complete, server computing system 12 may assign the transaction to an operational VM. In some examples, the operational VM is a newly-initialized VM to which server computing system 12 has assigned no other transaction. In other examples, server computing system 12 has already assigned one or more transactions to the operational VM.

In some examples, server computing system 12 may assign a single transaction to multiple VMs 20. Thus, in some examples, multiple VMs may receive packets associated with a single transaction. Server computing system 12 may continue to forward subsequent packets associated with the transaction to each of the assigned VMs. Thus, the states of each of the assigned VMs may be updated based on the packets associated with the transaction.

Responsive to the packets received by the multiple VMs, each of the multiple VMs assigned to the single transaction may generate a respective set of one or more response packets. Server computing system 12 (or another unit of server computing system 12) may process the sets of response packets. In some examples, when server computing system 12 processes the sets of response packets, server computing system 12 may forward one of the sets of response packets to a client device and discard the remaining sets of response packets. In other examples, when server computing system 12 processes the sets of response packets, server computing system 12 may compare the sets of response packets to determine whether the sets of response packets match. Server computing system 12 may determine that an error has occurred at one or more of the VMs if the sets of response packets do not match. When not all of the sets of response packets match, server computing system 12 may determine which version of the sets of response packets is most common. In other words, server computing system 12 may determine which set of response packets is most popular. Server computing system 12 may forward the most common version of the sets of response packets to the client device, discarding the remaining sets of response packets. Furthermore, in other examples, when server computing system 12 processes the sets of response packets and server computing system 12 determines that not all of the sets of response packets match, server computing system 12 does not forward any of the sets of response packets to the client device.

Assigning a single transaction to multiple VMs may assist with fault tolerance. In some examples, server computing device 12 may assign a single transaction to VMs running different operating systems. For example, server computing device 12 may assign a transaction to a first VM, a second VM, and a third VM. In this example, the first VM may run a Linux operating system, the second VM may run a MICROSOFT WINDOWS® operating system, and the third VM may run an APPLE OSX® operating system. In this example, all three VMs should return the same response packets. However, a cyber-attack targeting a vulnerability of one of the operating systems may cause the VM running that operating system to return incorrect response packets. In this example, the other two VMs may return matching correct response packets. Thus, if server computing device 12 forwards only the most common version of the sets of response packets, server computing device 12 may discard the incorrect response packets and may forward one set of the correct response packets to the client device. This may add an additional layer of security and/or fault tolerance to server computing system 12.

Thus, in some examples, packets may be forwarded to a plurality of resources (e.g., VMs). For example, all packets associated with a single TCP connection may be replicated and forwarded to three different resources. In this case, the "response data" sent to the external party (e.g., any data sent by FTN-managed resources) may be handled via a variety of policies. One such policy is to use a single resource as the "canonical" resource and to discard, or otherwise render impotent, data transmitted by the other resources. One such policy is to compare the outputs of the multiple resources, potentially performing higher-level semantic interpretation (e.g., application-layer) and to produce a new output based on the collective results of the multiple resources. One such policy is a "voting system," where the most-popular response is sent to the external party (e.g., computing device). One such policy may be a "parallel check," where an error condition is triggered if the responses from the individual resources are not identical.

Thus, in some such examples, the computing system (e.g., server computing system 12) may initialize, from the one or more common templates, a plurality of virtual machines that execute at the one or more computing devices of the computing system. Responsive to the occurrence of an initiation condition of the transaction, the computing system may assign the transaction to the plurality of virtual machines. The plurality of virtual machines may generate respective sets of response data. The computing system may select a particular set of response data from the sets of response data. For instance, the computing system may select a most common of the sets of the response data. The computing system may forward the particular set of response data to another computing system (e.g., one of client computing devices 16).

Although many examples of this disclosure have been described with regard to a server computing system, many such examples are applicable at a client computing systems or standalone computing system. For instance, many such examples may be implemented on desktop computing devices, mobile computing devices, kiosks, or other types of computing devices. In such examples, a transaction may be defined in additional ways. For example, a transaction may be defined as a user session of the client device. In this example, the client device may assign a log-in session to a VM running at the client device. The VM may perform processing associated with the log-in session. Furthermore, in this example, a transaction may begin when a user logs in to the client device and may end when the user logs out of the client device. The client device may discard the VM when the user logs out of the client device. Thus, the client device may assign a fresh VM to the next log-in session. Therefore, on the client device, actions performed on the client device by the previous user may have no effect of the VM assigned to the next log in session.

Thus, in some examples, a client computing system may initialize, from one or more common templates, a virtual machine that executes on one or more computing devices of the client computing system. Responsive to an occurrence of an initiation condition of a transaction, the client computing system may assign the transaction to the virtual machine. The virtual machine may generate, as part of the virtual machine processing the transaction, a database modification request associated with the transaction. Responsive to the database modification request associated with the transaction, the client computing system may perform a modification to a shared database (e.g., shared database 26) that is persisted independently of the virtual machine. Additionally, the client computing system may generate checkpoint data associated with the transaction. Responsive to a manual or automatic trigger, the client computing system may discard the virtual machine. Furthermore, responsive to a rollback request, the client computing system may use the checkpoint data associated with the transaction to roll back the modification to the shared database performed responsive to the database modification request associated with the transaction.

Furthermore, although many examples of this disclosure have been described with regard to VMs, many such examples are applicable to other types of resources. In some examples, a resource is a logical computer system with two following properties:
  a. The system is virtualized or is otherwise isolated (in a security sense).
  b. The system's state is controllable by a computing system (e.g., server computing system 12) such that its state can be recorded (checkpoint/snapshot) and the system can be reverted to the recorded state (rollback/restore). In some examples, there is no requirement that the recordable state is an arbitrary state, just that the recordable state is some state. In particular, only the ability to record an acceptable "clean" state may be required. If additional state is recordable, server computing system 12 may take advantage of that.

The resource may be a system running under hardware or platform virtualization, including full virtualization, partial virtualization, paravirtualization, and hardware-assisted virtualization. The virtualized system may then be under the control of a hypervisor.

A fight-through node (FTN), such as server computing system 12, may comprise software that manages a collection of one or more resources and that state of those resources according to a "resource lifetime strategy." In some examples, the virtualized system of server computing system 12 may be a virtual machine in an Infrastructure-as-a-Service cloud. The resource may be a full system, a partial system, or software running under operating-system-level virtualization (for example, vServer™, LXC™, OpenVZ™, jails). The virtualized system may be an entity in a Platform-as-a-Service cloud. The resource may be a virtualized or sandboxed application running under a non-virtualized operating system. The virtualized system may be an entity in a Software-as-a-Service cloud or in any of the related X-as-a-Service cloud models. The resource may be a physical system with controllable state. For example, the virtualized system may comprise a physical system that can be power-cycled and reimaged over an independent control channel. The collection of all resources managed by a single FTN may span multiple categories of resources listed above.

The types of encapsulation listed above may be nested, where each layer may be controllable by FTN. For example, a collection of FTN resources may consist of N physical machines that can be reimaged (e.g., with controllable power supplies, a boot-ROM, and a PXE image server), each of which runs M virtual machines, each of which contains K operating-system-level isolation containers.

In some examples, the resources (e.g., VMs) may be identical clones of a "template" system. For example, in the case of a fully-virtualized system, the template system may be a snapshot of the state of a suspended system (e.g., in which the content of RAM of the system has been written to disk or other non-volatile computer-readable storage medium). In other examples, the resources may be identical clones of a plurality of different templates. For example, the pool of resources may be N*M systems, consisting of N copies, each of M different but functionally equivalent templates.

In some examples, the resources may be dynamically modified on an individual resource on rollback/restore (e.g., the resource could have a unique MAC or IP address injected into the running system state after it is restored). This modification may be done by VM introspection, an agent on the resource, or agentless remote code execution.

An FTN may "accept" network packets or connections and send them to a set of resources according to an "allocation strategy." Packets sent from the resource to the originator are handled accordingly. That is, the FTN may act as a network proxy for the resources.

In some examples, network packets or connections could be a TCP connection, one or more UDP packets, or other collections of network packets (IP or not). The collection of packets sent to a particular resource could encompass more than a single connection. For instance, a collection of related connections could be sent to the same resource. For example, a Web browser typically establishes many connections in a short period to the same server when loading a Web page; all of these related connections could be sent to the same resource. This packet-forwarding could be performed as a "transparent proxy" (operating in the Layer 2-4 space) or as a "smart proxy" that understand the semantics of the transmitted data at the application layer (layer 7) and acts based on that information. Accordingly, the sent packets could be identical to the original packets or could be modified. The sent packets could represent only a fraction of a single (layer 4-5) connection. For example, in the case of a smart proxy, if a single TCP connection is used to transmit three HTTP requests, the three HTTP requests could be sent to different resources.

The resource may have network access to an external network, such as the Internet, or may be network-isolated. The resource may be connected to one or more back-end systems (e.g., through a network). The back-end systems may be physical machines, physical networks, arbitrary resources accessed over a network, or any of the system types listed above in "resource." An example may be a dedicated physical or virtual machine. The back-end systems may support one or more systems for data and/or execution state checkpoint and rollback. Those systems may in turn expose the checkpoint/rollback functionality to the FTN. Such systems include VM check pointing and check pointing file systems such as ZFS. These back-end systems may contain intrusion detection, fault detection, data-corruption detection, availability watchdogs, or other system health monitors. These monitors may be implemented within the back-end system, through VM introspection, or through remote execution using an agent or an agentless system. These monitors may be configured to provide information to the FTN, such as causing an alert with an intrusion, fault, or data corruption is detected.

The resources may be connected to the FTN through a data-transmission path, which may be a network. The network may be dedicated to this task and may be isolated from other networks. This network may be dynamically built by the FTN at run time. Each resource may be connected to the FTN by a separate network. The resources may be configured so that the individual networks connecting the FTN to each resource are identical (e.g., each resource has the same MAC and IP address but is on an independent network). Any of the above internal networks may be physical, partially virtual (e.g., VLANs), or fully virtual (e.g., hypervisor internal networking).

The FTN may implement an allocation strategy. The allocation strategy may be a policy for how to distribute packets to individual resources. The allocation strategy may use any layer-2 through layer-7 networking information, as well as information about the state(s) of the resources and back-end systems. As an example, the allocation strategy might create a strict one-to-one association between active TCP connections and resources. Thus, for one TCP connection, there may be a resource that is exclusively used by that one connection. As an example, the allocation might create a one-to-one association between a particular IP address and a resource, so that all traffic from that IP address is sent to the same resource. As an example, the allocation might send packets from different subnets to different sets of resources. For example, packets from an "internal" or "trusted" subnet might be sent to less-restricted resources while packets from "external" or "untrusted" subnets might be sent to more-restricted resources.

An FTN may selectively present, multiplex, or otherwise manage non-network I/O interfaces to the resources. For example, a "desktop FTN" might run two identical copies of a virtualized operating system, only one of which (the "active" VM) is attached to the display and captures keyboard and mouse input. When the resource lifetime strategy determines that the active VM should be restored to its original state, the FTN may make the inactive VM active, destroy the now-inactive (formerly active) VM, and create a new VM that is a clone of the original template as a new inactive VM.

A FTN may implement a resource lifetime strategy. The resource lifetime strategy may be a policy for when and how to restore/roll back resources and/or back-end systems to particular states. The resource lifetime may be tied to allocation strategy. The resource lifetime may be tied to user interface controls or other manual inputs. The resource lifetime may be tied to back-end system health monitors or other automated inputs. As one example, the FTN may use the allocation strategy that each TCP connection is associated with its own resource. The resource lifetime strategy may then be to restore that resource to its original state at the end of the TCP connection.

To support the transition to virtual endpoints and to defend against persistent and stealthy cyber attacks on computing systems by advanced adversaries, users may need the capability to use fast, reliable, and automated reconstitution of servers and endpoints for securing and maintaining networks and computer systems. In accordance with one or more techniques of this disclosure, a software platform (FTN-D) may transparently restore any protected system to a known-good state within seconds, compared to hours or more for current practices. This may directly addresses a need for enhanced capability: it may provide a reliable, automated, and secure reconstitution mechanism for servers and endpoints that can be used to refresh system health, reconstitute compromised machines after attacks, and combat persistent threats, including proactively reimaging systems as a tailored response option in anticipation of increased cyber threats.

Reimaging or rebuilding desktop and server systems may be a component of computer security and IT management. It may restore the computer to a pristine state, eliminating accumulated errors, data corruption, and persistent malware. Because it may be the only way to guarantee removal of persistent malware, reimaging is a necessary component of effective cyber intrusion incident response. However, reimaging may be a time-consuming process that has a serious negative impact on system availability.

FTN-D may solve this problem by providing a rapid system reconstitution capability, enabling reconstitution of a protected system within seconds rather than hours. FTN-D is a configurable architecture for using Disposable Virtual Machines (D-VMs) on servers and endpoints to provide fast system reconstitution and to improve system security and resilience. FTN-D may create and manage D-VMs and persistent storage systems, enabling FTN-D to securely and reliably restore a server or endpoint to a pristine state in near real time.

Figure 11:
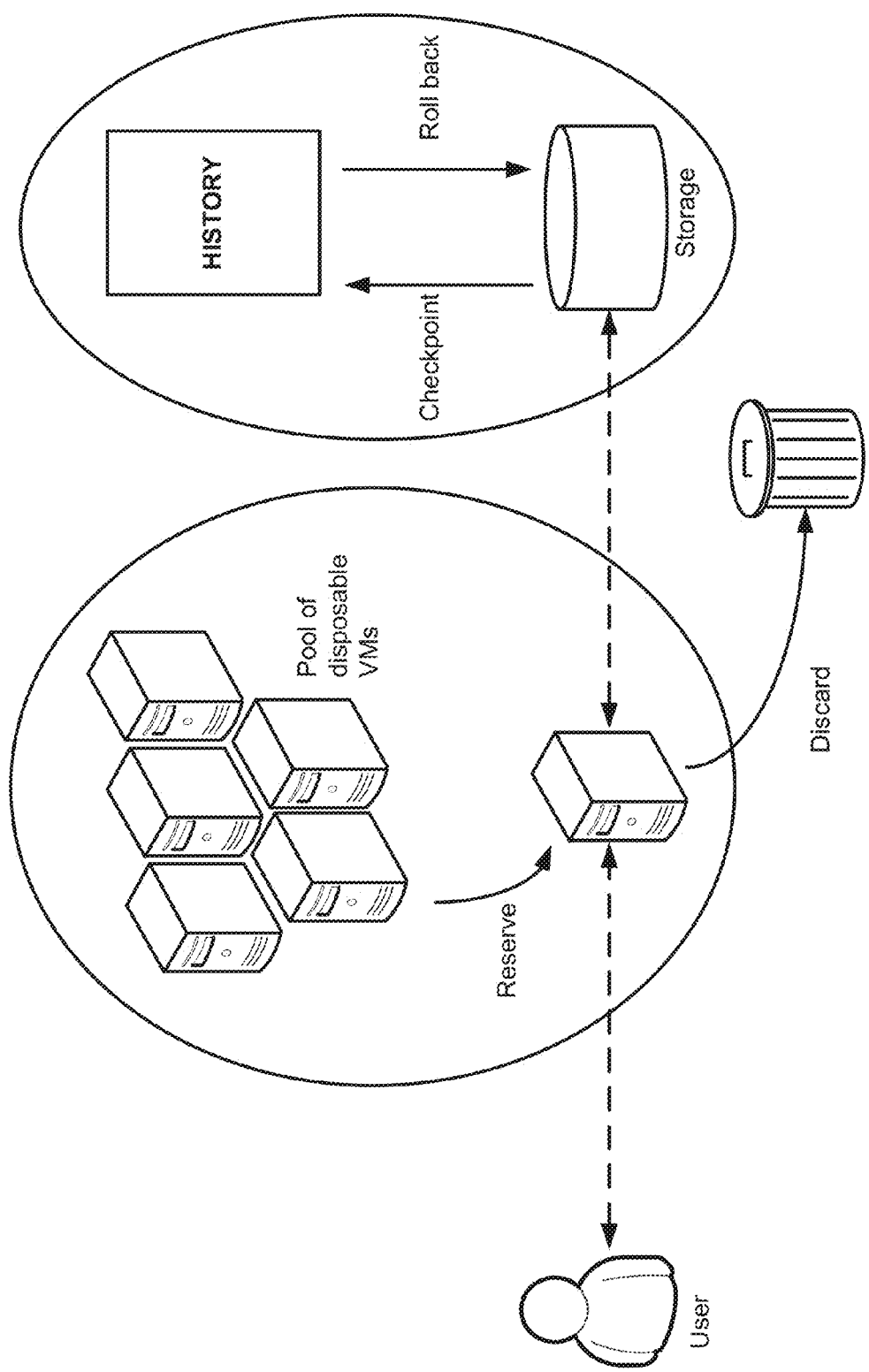
FIG. 11 is a conceptual diagram illustrating an example operation of a fight-through node with disposable virtual machines, in accordance with one or more techniques of this disclosure.

A capability of FTN-D is that it may encapsulate a system's runtime state in a disposable virtual machine. Users of the FTN-D-protected system interact with a D-VM that is a temporary clone of the pristine system state. FTN-D may use virtualization and commercial off-the-shelf (COTS) hypervisor software to manage these D-VMs. The D-VM can be discarded and replaced with a new, pristine clone within seconds at the end of a user's session or in response to an automated or manual trigger, for example, as a response to software fault or cyber attack (FIG. 11). FIG. 11 is a conceptual diagram illustrating an example operation of a fight-through node with disposable virtual machines, in accordance with one or more techniques of this disclosure. FTN-D provides fast system reconstitution and makes persistent attack effects temporary using disposable virtual machines supported by fast checkpointed storage. In a multi-user system, such as a server, FTN-D can reserve a different, isolated D-VM for each user session so that persistent effects are isolated to that user's D-VM and do not affect any other users.

FTN-D may support the D-VMs with shared, persistent storage that features fast data rollback capabilities. FTN-D may provide this storage to the D-VMs using an isolated persistent-storage virtual machine. The storage system may provide fast, lightweight, and fine-grained file system checkpointing and rollback, enabling restoration to known-good data within seconds (FIG. 11, above). D-VMs may communicate with the storage system through restricted channels to minimize the attack surface. FTN-D can integrate with intrusion detection systems and other sources of alerts to instantly and automatically roll back storage to a pristine or pre-attack state as soon as an attack is detected. FTN-D may automatically retain an isolated copy of the pre-rollback (compromised) system state to support subsequent incident analysis and can be used to selectively reconstitute the system up to the point of compromise.

In addition to providing fast system reconstitution capabilities, FTN-D is a powerful approach to improving system security and combating persistent threats. By frequently discarding and replacing the D-VMs, thus restoring the runtime state of the system to a pristine state, FTN-D may eliminate the persistence of malware and other cyber attack effects. FTN-D may turn persistent attacks into temporary attacks.

One example application of the FTN-D technology is FTN-D Server, which comprises a platform for hosting virtualized server software. The FTN-D Server software may run on COTS server hardware and is transparent to both client and server software. FTN-D Server can be configured to support different defensive postures with different D-VM allocation strategies and lifetimes. A server running FTN-D may periodically refresh to a pristine, known-good state, instantly and transparently, to maintain health and combat persistent threats. As response to an elevated threat of cyber attack, an administrator can switch a FTN-D server to a defensive posture in which every connection to the server is isolated to its own D-VM, eliminating all threat of malware and persistent attacks.

FTN-D Server may increase performance and system robustness, improve system management functionality, and may provide scalability to multiple physical servers. It may enhance FTN's configurability to support a wide variety of policies for when to refresh the D-VMs, enabling a system to choose between different defensive postures depending on the desired performance/efficiency tradeoff. This may also enable FTN-D Server to host a wider variety of server applications. FTN-D may integrate an intrusion detection system, such as Snort® or Tripwire®, with the storage component to demonstrate automated rollback capabilities.

Another application of the FTN-D technology is FTN-D Desktop is a standalone software product for providing FTN-D's rapid-reconstitution capability to endpoint hardware running COTS operating systems (OSes). FTN-D Desktop may comprise a base "host" OS and the FTN-D software. System administrators may install a COTS "guest" OS on top of this software stack; the end user interacts with clones of the guest OS. FTN-D Desktop may support both thick and thin endpoints and all major desktop OSes; some versions of FTN-D Desktop support mobile devices and other platforms. FTN-D Desktop may provide a network-connected virtual endpoint that reverts to a pristine state within seconds of the end of a user session or in response to software faults or cyber-attack.

FTN-D Desktop is a specialized application of the FTN technology, where the system is hosting only a single D-VM at a time and that D-VM is an interactive desktop OS. FTN-D Desktop may be customized to work with all-local system components and a single D-VM. The storage component for desktop may be customized for usage scenarios and for integration with desktop OSes. A session policy and refresh triggers appropriate for desktop use may be implemented and an interface to interact with storage system for check-pointing and rollback may be created. FTN-D may be provide a secure, networked command-and-control system to manage FTN-D Desktop remotely. FTN-D Desktop may be fully integrated with a COTS desktop host operating system and create a software installer that facilitates easily installing the FTN-D Desktop software stack and a guest operating system on an endpoint machine. FTN-D Desktop may be tested with representative endpoint hardware systems and OSes to demonstrate compatibility.

The following paragraphs describe additional examples:

"FTN Limited" (Read-only FTN): In this example, an FTN server holds no persistent state. For instance, the system of the "FTN Limited" example may be similar to the example server computing system of FIG. 1, except without database management system 24 or without the ability to write data to shared database 26. Because the FTN server stores no persistent state, there is no opportunity for data corruption. As a result, the FTN server of the "FTN Limited" example may be highly secure and very fast. In this example, data available for clients to read is either replicated on each virtual worker's (e.g., VM's) local file system, or centrally located on a persistent data store that is made available to workers (e.g., VMs) in a read-only manner. By eliminating client threats to the FTN server's data, the number of components needed may be reduced. For instance, no intrusion detection system, checkpointing, or rollback may be necessary. Thus, an FTN server in the "FTN Limited" example may be more secure, have higher performance, be simpler and cheaper, and may protect data integrity. However, an FTN server in the "FTN Limited" example may have more limited capabilities because clients are not able to cause state changes, and no sessions may be possible. In some versions of the "FTN Limited" example, the FTN server allows for persistent application state without persistent user data. Furthermore, in other versions of the "FTN Limited" example, the FTN server allows no persistent state or data at all.

"FTN Gateway" (FTN Tier 1 Servers): In this example, an FTN has front-end components and disposable VMs, but connects to a custom back-end instead of a simple persistent storage back-end. In this example, the FTN may replace an enterprise's current front-line servers with disposable VMs, but retain the rest of the enterprise's infrastructure. In this example, the FTN may use only the front-end and worker (e.g., VM) components of the FTN and may use customer-provided infrastructure for the back end. The FTN may include a persistent state server to preserve worker (e.g., application) state between refreshes of the VMs. This example may be advantageous to some users that use existing back-end business processes and/or databases. In some versions of this example, VMs are refreshed per user session rather than per individual transaction.

"Cloud FTN" (Use Cloud hardware for FTN VMs): In this example, an FTN implements some or all FTN components in a cloud instead of locally at a facility of a user of the FTN. For instance, one or more cloud-based VMs could be implemented in the cloud. In this example, the front-end components or back-end storage may also be implemented in the cloud. Furthermore, in some examples where worker VMs are no longer on a local IPv6 network, the worker VMs may have unique IP addresses. The use of unique IP addresses may complicate worker VM generation slightly due to a potential need to configure each VM's IP rather address than use identical clones. Advantageously, in this example, a customer may not need to provide hardware resources for workers, and may provide higher elasticity and scalability. Some versions of the "Cloud FTN" example implement a hybrid FTN with local VMs and can use cloud VMs when load is high or under other circumstances.

"Lightweight FTN" (Use lightweight VMs for workers): In some examples provided elsewhere in this disclosure, FTNs are designed to use hardware-level VMs such as VirtualBox™, Xen™, or VMware™ to host workers (e.g., worker VMs). Although hardware-level VMs provide good isolation, they are quite heavyweight performance-wise and may have more capabilities than necessary. For instance, hardware-level VMs may be able to run arbitrary OSs when it only may be necessary to run a single particular OS. In this "Lightweight FTN" example, a FTN uses OS-level isolation for disposable workers (e.g., VMs), such as Solaris™ containers, BSD jails, OpenVZ/Virtuozzo, and Linux chroot. Although OS-level VMs may provide worse isolation, they are lighter weight and may provide better performance. Thus, in at least some instances, "Lightweight FTN" examples may provide faster performance than examples that use hardware-level VMs.

"Alert FTN" (FTN with IDS in workers to provide alarms): In this example, IDSs are included in the worker VMs. In some implementations, the IDSs provide VM introspection. IDSs in the VMs may alert users to attacks (e.g., cyber attacks). The attacks to which the users are alerted may belong to the types detected by whatever IDSs are installed. In this example, host-based commercial IDSs may be installed into a worker VM template. Furthermore, in some examples, a communication bridge may exist between the VMs and a host for triggering IDSs and receiving results. In examples where IDSs need to retain state over time, the IDS may use the persistent storage component (e.g., shared database 26). The "Alert FTN" example may have the advantage of notifying users of attacks that may otherwise have been ignored. In some versions of the "Alert FTN" example, the front end components of the FTN include a network IDS instead of or in addition to host-based IDSs inside the VMs.

"High Assurance FTN" (FTN with Diversity Protection and a voting algorithm). In this example, dispatcher 38 is augmented with the ability to store and forward transaction requests (e.g., to workers, such as VMs 20) and responses (e.g., to clients, such as client computing devices 16). With dispatcher 38 buffering of requests, server computing system 12 may duplicate and send a single transaction request to multiple VMs. If the internals of these VMs are diverse (e.g., the VMs run different OSs and service versions; different sets of VMs execute under different hypervisors, etc.), then an attack may have a different effect on each, causing a different response from different VMs. With dispatcher 38 buffering of responses, server computing system 12 may hold the responses from multiple VMs until the VMs have all finished processing the same request. Server computing system 12 may then compare the responses against each other. If the relevant parts of the responses do not match, server computing system 12 may determine that an attack or at least a fault has occurred and may raise an alarm. Additionally, server computing system 12 may roll back the persistent state of VMs to just prior to the transaction to delete any effects of the transaction. Because the transaction responses are buffered, the response does not need to be sent back to a client. Therefore, the entire malicious transaction may have no effect on server computing system 12, and a response may not be sent back to the client so the state of the FTN will not be inconsistent from the point of view of the client. A potential drawback of this approach is that may require that transaction processing be strictly serialized.

In some "High Assurance FTN" examples, FTN front-end components (e.g., handlers, such as handler 44) store transaction responses and forward the transaction responses back to clients only after voting validates results as consistent and/or expected. Furthermore, some "High Assurance FTN" examples employ a custom set up of two or more OSs and applications to provide services with identical interfaces but unique implementations. In some such examples, the comparison of results may take into account different response formats of each OS/application pair. Advantageously, "High Assurance FTN" examples may be able to provide an uncommon type of IDS, do not return transaction results to hostile clients, may roll back malicious changes to persistent state, and may provide fault tolerance if one worker fails.

"Multiservice FTN" (Multiple, application-level dispatchers): Some FTN designs execute a single VM template with a single service and forward all TCP sessions to workers with that template. In "Multiservice FTN" examples, a modified dispatcher (e.g., a modified version of dispatcher 38 or one or more dispatcher plugins) may operate at an application level instead of the TCP level. The modified dispatcher may recognize different protocols. For instance, the modified dispatcher may be able to recognize incoming packets as belonging to different protocols based on the targeted ports of the incoming packets and/or by pattern-matching data headers in the incoming packets. Additionally, "Multiservice FTN" examples may use multiple VM pools. Each respective VM pool may use a different template. As a result, the modified dispatcher that can, in some examples, send http (web) requests to workers running http servers, and can send smtp (email) requests to workers running email servers. Another potential advantage of protocol-level dispatchers is that protocol-level dispatchers may be able to interpret transactions as more fine-grained than a TCP session. This may provide attackers with an even smaller attack window, because holding a TCP session open would no longer maintain access to a worker VM.

Some "Multiservice FTN" examples are implemented using application-specific proxies as plugins to a main dispatcher, such as dispatcher 38. Additional "Multiservice FTN" examples base forwarding of incoming packets to workers on the target port and continue to use TCP sessions as transactions. Such additional "Multiservice FTN" examples may provide the multi-protocol functionality described above without the complication (or security) of fine-grained transactions. However, such additional "Multiservice FTN" examples may add support for multiple worker VM templates and the ability to differentiate and route to them separately. "Multiservice FTN" examples may let users host multiple services on a single FTN with no significant performance or security penalties under normal operating conditions.

"Fight Through Client": In this example, an FTN is used to protect clients from malicious servers. For instance, in this example, disposable VM clients auto-refresh themselves per the techniques of this disclosure. Thus, instead of generating workers (e.g., worker VMs) to serve incoming client requests, a client computing device generates workers that make outgoing client requests. The client computing device disposes of workers after some number of transactions (e.g., 1 or more) and then a user is presented with a new worker. For example, a transaction may be defined as a user session of the client device. For instance, in general-purpose personal computing device, a "transaction" may be a login session (i.e., the transaction ends when the user logs out). In another example involving a general-purpose computing device, a transaction may correspond to a single virtual power cycle, i.e., a transaction ends when the computing device is restarted or shut down and begins when the device restarts. In another example involving a shared general-purpose computing device, a transaction may end when the computing device enters an idle state. For instance, in this example, the transaction may end when the computing device enters a locked state, a sleep state, or after there has been no user input for a particular amount of time. In this example, a new transaction may begin when the computing device exits the idle state. In another example, a secure computing device has an associated physical access token, such as a military computing device requiring an access card. In this example, the transaction ends when the physical access token is removed. In this example, a new transaction may begin when a physical access token is inserted into a token reader of the computing device. In another example, a transaction may terminate on a computing device, such as a paid desktop computer at a cybercafé, when a paid-for time has expired. Special-purpose computers, such as kiosks, may have application-specific definitions of "transaction." For example, ATMs and airline kiosks have well defined "customer sessions." FTN-D could use these transactions, so that the worker VM is replaced in between customers.

In some examples, a "Fight Through Client" system may use virtual machines only for particular or individual applications. For example, a computing device does not use the "Fight Through Client" technique for all applications, but may use a "Fight Through Client" VM for a web browser on the computing device. In this example, the computing device may use an application-specific definition of a transaction, such as a "session" in a Web browser.

In some examples, the client-side workers provide a desktop or an application GUI to the user. In some examples, some state information is transferred between worker instances on the client computing device. Advantageously, some "Fight Through Client" examples do not need to rely on an IDS for security. Some "Fight Through Client" examples provide single-client VMs or multi-client VMs. In some examples, a single-client VM provides one VM to a single user and a multi-client VM provides one VM to multiple users. In other words, some "Fight Through Client" examples have VMs that are provided for multiple clients and/or users.

Furthermore, some "Fight Through Client" examples implement auto-refresh policies for worker VMs. Other "Fight Through Client" examples implement manual refresh policies for worker VMs.

Different examples of the FTN-D concept vary the implementation of the same basic system components: a front end, disposable workers, persistent storage, intrusion detection system(s), and more. The number of design parameters and variety of choice of each design parameter may afford a large number of variant FTN-D systems.

For instance, different examples techniques of this disclosure may provide for protection of servers. Furthermore, some examples provide protection for clients (e.g., applications on workstations or laptops), specific applications (e.g., browsers), or all applications. Such clients may or may not employ persistent storage. Some examples provide protection for mobile devices or other types of devices, such as hardware or embedded devices.

Furthermore, different example techniques of this disclosure may provide different worker types. For instance, some examples use heavyweight VMs (e.g., VMware™, Xen™, VirtualBox™). Some examples use lightweight containers (e.g., Jails, Containers, Chroot), physical hosts, or cloud resources.

Different example techniques of this disclosure may provide different levels of service. For instance, various examples may provide infrastructure, platform, software, or multi-service levels of service. Infrastructure-as-a-Service (IaaS), Platform-as-a-Service (PaaS), and Software-as-a-Service (SaaS) are basic cloud service classifications, though there are many cloud services that fall outside these classifications or span multiple categories.

Furthermore, different example techniques of this disclosure may provide different options with regard to persistent state. For instance, in some example configurations, the persistent state is read-only (e.g., no persistence of user data or application state). In other example configurations, the persistent state may be a built-in persistent state (for drop-in servers). The built-in persistent state may be standardized, pre-packaged or generic. Furthermore, in still other example configurations, the persistent state may be a custom persistent state (e.g., for enterprise solutions). One potential benefit of using VMs with a built-in persistent state is the ability to avoid complicated configurations of VMs. Including a built-in persistent state may be it is possible to offer VMs already configured in a product to reduce the work necessary to create a server under FTN.

Additionally, different examples may or may not implement persistent state security. For instance, some examples implement a file system IDS and/or a database constraint IDS. Different examples may have different IDS check frequency and/or IDS time (trade-off for thoroughness).

Furthermore, different examples may have different checkpointing policies. For instance, in some examples, a checkpoint policy requires checkpoint data to be generated for every transaction, for every N transactions, on a time-based schedule, or never. Different examples may also have different rollback policies.

Different examples may have different dispatcher configurations. For instance, in some different examples, a dispatcher may organize incoming packets into transactions at different levels, such as a TCP level, an application level, or an IP level. Furthermore, different examples may implement different dispatcher policies. For example, some dispatcher policies use serial workers (forced ordering, slower, stricter checkpointing). Other dispatcher policies use parallel workers (higher performance, fuzzy checkpointing). Furthermore, some dispatcher policies implement a pass-through model (e.g., to instantly respond to clients). Other dispatcher policies implement a store-and-forward model (e.g., to buffer client responses pending security analysis, e.g., voting).

Furthermore, different examples may have different worker policies and/or configurations. For instance, some examples use disposable workers. Other examples may use at least some persistent workers. Furthermore, some examples may implement proactive recovery policies for disposable workers. Such recovery (e.g., refresh) policies may include: none, after every transaction, after every n transactions, IDS-triggered, and manual. In addition, some examples implement intrusion detection for workers (e.g., in an execution environment of the workers). In some such examples, the IDSs may trigger refresh of workers and/or trigger rollback of data. In some examples, the IDSs are just for situational awareness.

Other examples may provide for FTN-aware clients, adjusting dispatcher timeouts, firewall integration, fault tolerance, handling DoS attacks, voting algorithm (parallel processing of requests) as an IDS, checkpointing VM states for later analysis, diversity in workers or applications, combining diversity with voting, protecting/monitoring the hypervisor/host, and using the FTN as a "first tier" or "front line" enterprise components. Furthermore, different choices in the design parameter space may emphasize particular aspects, including: performance (e.g., client latency), security (e.g., front end security, back end security), functionality (e.g., read only, persistent state, IDS/rollback), situational awareness (e.g., knowing about attacks or not), usability (e.g., migration, configuration, updating, etc.), and installation effort.

The following paragraphs provide a non-exclusive list of examples of this disclosure.

Example 1

A method comprising: receiving, by the computing system, a plurality of messages from one or more client computing devices, each of the plurality of messages corresponding to a transaction in a plurality of transactions; for each respective transaction in the plurality of transactions: initializing, by a computing system and from a common template that has been determined to be free of malware infection, a respective one of a plurality of virtual machines that execute at one or more computing devices of the computing system, wherein initializing comprises initializing an instance of an application on the respective virtual machine in accordance with application state stored within a shared database; wherein the plurality of messages includes a request to initiate a respective communication session between the computing system and a particular client computing device among the one or more client computing devices; in response to receiving the request to initiate the respective communication session, assigning, by the computing system, the respective transaction to a respective virtual machine from the plurality of virtual machines, wherein the respective transaction is the first transaction assigned to the respective virtual machine; generating, by the respective virtual machine, as part of the respective virtual machine completing the respective transaction, a database modification request associated with the respective transaction; performing a modification to the shared database in response to the database modification request associated with the respective transaction, wherein the database modification request requests modification, within the shared database, of the application state for the application running on the respective virtual machine, and wherein the shared database is persisted independently of the plurality of virtual machines; generating checkpoint data associated with the respective transaction; in response to determining that processing of the respective transaction is complete upon detecting termination of the respective communication session, discarding, by the computing system, the respective virtual machine; and in response to determining that the respective transaction is associated with a cyber-attack, using the checkpoint data associated with the respective transaction to roll back the modification to the shared database performed in response to the database modification request associated with the respective transaction.

Example 2

The method of example 1, wherein initializing the plurality of virtual machines comprises initializing each virtual machine in the plurality of virtual machines in response to receiving a message that corresponds to a new transaction.

Example 3

The method of example 1, wherein the respective communication session is a Transmission Control Protocol (TCP) session between the computing system and a particular client computing device among the one or more client computing devices.

Example 4

The method of example 3, wherein generating the checkpoint data associated with the respective transaction comprises generating a checkpoint in response to initiation or termination of the TCP session.

Example 5

The method of example 1, wherein each of the plurality of virtual machines is a type I hypervisor, a type II hypervisor, a paravirtualized virtual machine, a fully virtualized virtual machine, an application-level virtual machine, or an operating system-level virtual machine.

Example 6

The method of example 1, wherein the shared database is accessible to each of the plurality of virtual machines.

Example 7

The method of example 1, wherein the application is a server that provides a network service.

Example 8

The method of example 1, wherein generating the checkpoint data associated with the respective transaction comprises generating the checkpoint data associated with the respective transaction in response to the database modification request associated with the respective transaction.

Example 9

The method of example 1, wherein generating the checkpoint data associated with the respective transaction comprises generating the checkpoint data associated with the respective transaction in response to determining that a number of database modification requests associated with the respective transaction exceeds a threshold.

Example 10

The method of example 1, further comprising determining that the respective transaction request is associated with a cyber-attack in response to determining that the respective transaction is associated with an unauthorized request to access or modify data in the shared database.

Example 11

The method of example 1, further comprising determining that the respective transaction request is associated with a cyber-attack in response to determining that the respective transaction attempted to perform an unauthorized modification of programming code of the respective virtual machine or an unauthorized modification of a configuration of the respective virtual machine.

Example 12

The method of example 1, wherein each of transactions in the plurality of transactions corresponds to a single message in the plurality of messages.

Example 13

A computing system comprising: a shared database; and one or more computing devices configured to: receive a plurality of messages from one or more client computing devices, each of the plurality of messages corresponding to a transaction in a plurality of transactions; for each respective transaction in the plurality of transactions: initialize, from a common template that has been determined to be free of malware infection, a respective one of a plurality of virtual machines that execute at one or more of the computing devices of the computing system, wherein initializing comprises initializing an instance of an application on the respective virtual machine in accordance with application state stored within a shared database; wherein the plurality of messages includes a request to initiate a respective communication session between the computing system and a particular client computing device among the one or more client computing devices; in response to receiving the request to initiate the respective communication session, assign the respective transaction to a respective virtual machine from the plurality of virtual machines, wherein the respective transaction is the first transaction assigned to the respective virtual machine; generate, as part of the respective virtual machine completing the respective transaction, a database modification request associated with the respective transaction; perform a modification to the shared database in response to the database modification request associated with the respective transaction, wherein the database modification request requests modification, within the shared database, of the application state for the application running on the respective virtual machine, and wherein the shared database is persisted independently of the plurality of virtual machines; generate checkpoint data associated with the respective transaction; in response to determining that processing of the respective transaction is complete upon detecting termination of the respective communication session, discard the respective virtual machine; and in response to determining that the respective transaction is associated with a cyber-attack, use the checkpoint data associated with the respective transaction to roll back the modification to the shared database performed in response to the database modification request associated with the respective transaction.

Example 14

The computing system of example 13, wherein the one or more processors are configured to initialize a virtual machine in the plurality of virtual machines in response to receiving a message that corresponds to a new transaction.

Example 15

The computing system of example 13, wherein the respective communication session is a Transmission Control Protocol (TCP) session between the computing system and a particular client computing device among the one or more client computing devices.

Example 16

The computing system of example 15, wherein the one or more processors are configured to generate the checkpoint data associated with the respective transaction such that the one or more processors: generate a first checkpoint in response to initiation of the TCP session; and generate a second checkpoint in response to termination of the TCP session.

Example 17

The computing system of example 13, wherein the shared database is accessible to each of the plurality of virtual machines.

Example 18

The computing system of example 13, wherein each of transactions in the plurality of transactions corresponds to a single message in the plurality of messages.

Example 19

A non-transitory computer-readable data storage medium having stored thereon instructions that, when executed, configure a computing system to: receive a plurality of messages from one or more client computing devices, each of the plurality of messages corresponding to a transaction in a plurality of transactions; for each respective transaction in the plurality of transactions: initialize, from a common template that has been determined to be free of malware infection, a respective one of a plurality of virtual machines that execute at one or more of the computing devices of the computing system, wherein initializing comprises initializing an instance of an application on the respective virtual machine in accordance with application state stored within a shared database; wherein the plurality of messages includes a request to initiate a respective communication session between the computing system and a particular client computing device among the one or more client computing devices; in response to receiving the request to initiate the respective communication session, assign the respective transaction to a respective virtual machine from the plurality of virtual machines, wherein the respective transaction is the first transaction assigned to the respective virtual machine; generate, as part of the respective virtual machine completing the respective transaction, a database modification request associated with the respective transaction; perform a modification to the shared database in response to the database modification request associated with the respective transaction, wherein the database modification request requests modification, within the shared database, of the application state for the application running on the respective virtual machine, and wherein the shared database is persisted independently of the plurality of virtual machines; generate checkpoint data associated with the respective transaction; in response to determining that processing of the respective transaction is complete upon detecting termination of the respective communication session, discard the respective virtual machine; and in response to determining that the respective transaction is associated with a cyber-attack, use the checkpoint data associated with the respective transaction to roll back the modification to the shared database performed in response to the database modification request associated with the respective transaction.

Example 20

A network node comprising: a hardware-based processing system having a set of one or more processing units; a plurality of virtual machines (VMs) executing on the one or more processing units, wherein each of the plurality of virtual machines is initialized from a common template that has been determined to be free of malware infection; a dispatcher that: receives, from one or more client computing devices, a plurality of messages corresponding to transactions in a plurality of transactions, wherein, for each respective transaction in the plurality of transactions, wherein the plurality of messages includes a request to initiate a respective communication session between the network node and a particular client computing device, assigns, in response to receiving the requests to initiate the respective communication sessions, each of the transactions to the plurality of virtual machines, and discards each of the VMs when the transactions assigned to the VMs are complete upon detecting termination of the respective communication sessions; one or more intrusion detection systems that detect whether any of the VMs have been compromised and whether a shared database has been compromised; a checkpointing module that generates checkpoint data based on requests from the VMs to modify the shared database, and a rollback module that uses the checkpoint data to roll back modifications to the shared database that are associated with a particular transaction when the one or more intrusion detection systems determine that a VM to which the particular transaction was assigned has been compromised or the shared database has been compromised, wherein: the one or more processors are configured such that for each respective virtual machine from the plurality of virtual machines, the one or more processors generate a database modification request as part of completing a respective transaction from the plurality of transactions, the database modification request requesting storage to the shared database of an application state of an application running on the respective virtual machine, and the one or more processors initialize, from the common template, a particular virtual machine such that an instance of the application running on the particular virtual machine has the application state of the application running on one of the virtual machines.

Example 21

A method comprising: initializing, by a computing system and from one or more common templates, a virtual machine that executes at one or more computing devices of the computing system; responsive to an occurrence of an initiation condition of a transaction, assigning, by the computing system, the transaction to a virtual machine from the plurality of virtual machines; generating, by the virtual machine, as part of the virtual machine processing the transaction, a database modification request associated with the transaction; performing a modification to a shared database responsive to the database modification request associated with the transaction, wherein the shared database is persisted independently of the virtual machine; generating checkpoint data associated with the transaction; responsive to a manual or automatic trigger, discarding, by the computing system, the virtual machine; and responsive to determining that the transaction is associated with a cyber-attack, using the checkpoint data associated with the transaction to roll back the modification to the shared database performed responsive to the database modification request associated with the transaction.

Example 22

A method comprising: initializing, by a computing system and from one or more common templates, a virtual machine that executes at one or more computing devices of the computing system; assigning, by the computing system, one or more transactions to a virtual machine from the plurality of virtual machines; generating, by the virtual machine, as part of the virtual machine processing the one or more transactions, a database modification request associated with the one or more transactions; performing a modification to a shared database responsive to the database modification request associated with the one or more transactions, wherein the shared database is persisted independently of the virtual machine; generating checkpoint data associated with the one or more transactions; responsive to completion of each of the one or more transactions assigned to the virtual machine, discarding, by the computing system, the virtual machine; and responsive to determining that at least one of the one or more transactions is associated with a cyber-attack, using the checkpoint data associated with the at least one of the one or more transactions to roll back the modification to the shared database performed responsive to the database modification request associated with the at least one of the one or more transactions.

Example 23

The method of example 22, further comprising: determining, by the computing system, based on computing resources of the computing system, a maximum number of transactions the computing system assigns to the virtual machine.

Example 24

The method of example 22, further comprising: determining, by the computing system, based on a defensive posture of the computing system, a maximum number of transactions that the computing system assigns to the virtual machine.

Example 25

The method of example 22, further comprising: determining, by the computing system, based on an identity of a user associated with that at least one of the one or more transactions assigned to the virtual machine, a maximum number of transactions that the computing system assigns to the virtual machine.

Example 26

The method of example 22, further comprising: determining, by the computing system, based on a type of transaction assigned to the virtual machine, a maximum number of transactions that the computing system assigns to the virtual machine.

Example 27

A method comprising: initializing, by a computing system and from one or more common templates, a virtual machine that executes at one or more computing devices of the computing system; responsive to receiving data from a new source, assigning, by the computing system, a stream of data from the new source to a virtual machine from the plurality of virtual machines; generating, by the virtual machine, as part of the virtual machine processing the stream of data from the new source, a database modification request associated with the stream of data from the new source; performing a modification to a shared database responsive to the database modification request associated with the stream of data from the new source, wherein the shared database is persisted independently of the virtual machine; generating checkpoint data associated with the stream of data from the new source; responsive to a termination event, discarding, by the computing system, the virtual machine; and responsive to determining that the stream of data from the new source is associated with a cyber-attack, using the checkpoint data associated with the stream of data from the new source to roll back the modification to the shared database performed responsive to the database modification request associated with the stream of data from the new source.

Example 28

The method of example 27, wherein the termination event is an elapsing of a particular amount of time following receiving a last unit of data from the new source.

Example 29

The method of example 27, wherein the stream of data from the new source comprises a stream of User Datagram Protocol data.

Example 30

The method of example 28, wherein the termination event is an indication of a termination of an application level session.

Example 31

A method comprising: initializing, by a computing system and from one or more common templates, a virtual machine that executes at one or more computing devices of the computing system; assigning, by the computing system, transactions belonging to a first class to virtual machines from the plurality of virtual machines that are subject to a first refresh policy; assigning, by the computing system, transactions belonging to a second, different class to virtual machines from the plurality of virtual machines that are subject to a second, different refresh policy; generating, by the plurality of virtual machines, as part of the virtual machines processing the transactions belonging to the first class and the transactions belonging to the second class, database modifications requests associated with the transactions belonging to the first class and the transactions belonging to the second class; performing modifications to a shared database responsive to the database modification requests, wherein the shared database is persisted independently of the plurality of virtual machines; generating checkpoint data associated with the transactions belonging to the first class and the transactions belonging to the second class; discarding, by the computing system, according to the first refresh policy, the virtual machines subject to the first refresh policy; discarding, by the computing system, according to the second refresh policy, the virtual machines subject to the second refresh policy; and responsive to determining that a particular transaction is associated with a cyber-attack, using checkpoint data associated with the particular transaction to roll back the modification to the shared database performed responsive to a database modification request associated with the particular transaction, wherein the particular transaction is among the transactions belonging to the first class or the transactions belonging to the second class.

Example 32

The method of example 31, wherein: discarding the virtual machines subject to the first refresh policy comprises discarding, by the computing system, each respective virtual machine of the virtual machines subject to the first refresh policy after the respective virtual machine has completed processing a first number of transactions; and discarding the virtual machines subject to the second refresh policy comprises discarding, by the computing system, each respective virtual machine of the virtual machines subject to the second refresh policy after the respective virtual machine has completed processing a second number of transactions, wherein the first number of transactions is greater than the second number of transactions.

Example 33

The method of example 32, wherein the second number of transactions is equal to 1.

Example 34

A method comprising: initializing, by a computing system and from one or more common templates, a virtual machine that executes at one or more computing devices of the computing system; responsive to an occurrence of an initiation condition of a first transaction: determining, by the computing system, whether multiple transactions are allowed to be assigned to a virtual machine from the plurality of virtual machines, wherein a second transaction is already assigned to the virtual machine; assigning, by the computing system, the transaction to the virtual machine when multiple transactions are allowed to be assigned to the virtual machine; generating, by the virtual machine, as part of the virtual machine processing the first transaction, a database modification request associated with the first transaction; performing a modification to a shared database responsive to the database modification request associated with the first transaction, wherein the shared database is persisted independently of the virtual machine; generating checkpoint data associated with the first transaction; responsive to completion of the first transaction and the second transaction, discarding, by the computing system, the virtual machine; and responsive to determining that the first transaction is associated with a cyber-attack, using the checkpoint data associated with the first transaction to roll back the modification to the shared database performed responsive to the database modification request associated with the first transaction.

Example 35

A method comprising: initializing, by a computing system and from one or more common templates, a virtual machine that executes at one or more computing devices of the computing system; responsive to an occurrence of an initiation condition of a transaction, assigning, by the computing system, the transaction to a virtual machine from the plurality of virtual machines; generating, by the virtual machine, as part of the virtual machine processing the transaction, a database modification request associated with the transaction; performing a modification to a shared database responsive to the database modification request associated with the transaction, wherein the shared database is persisted independently of the virtual machine; generating checkpoint data associated with the transaction; responsive to determining that the virtual machine has become non-operational, discarding, by the computing system, the virtual machine; and responsive to determining that the transaction is associated with a cyber-attack, using the checkpoint data associated with the transaction to roll back the modification to the shared database performed responsive to the database modification request associated with the transaction.

Example 36

A method comprising: initializing, by a computing system and from one or more common templates, a virtual machine that executes at one or more computing devices of the computing system; responsive to an occurrence of an initiation condition of a transaction, assigning, by the computing system, the transaction to the plurality of virtual machines; generating, by the plurality of virtual machines, respective sets of response data; selecting, by the computing system, a particular set of response data from the sets of response data; forwarding, by the computing system, the particular set of response data to another computing system; generating, by the plurality of virtual machines, as part of the virtual machine processing the transaction, database modification requests associated with the transaction; performing modifications to a shared database responsive to the database modification requests associated with the transaction, wherein the shared database is persisted independently of the virtual machines; generating checkpoint data associated with the transaction; responsive to completion of the transaction, discarding, by the computing system, the plurality of virtual machines; and responsive to determining that the transaction is associated with a cyber-attack, using the checkpoint data associated with the transaction to roll back the modifications to the shared database performed responsive to the database modification requests associated with the transaction.

Example 37

The method of example 36, wherein selecting the particular set of response data comprises selecting, by the computing system, a most common of the sets of the response data.

Example 38

A method comprising: initializing, by a client computing system and from one or more common templates, a virtual machine that executes at one or more computing devices of the client computing system; responsive to an occurrence of an initiation condition of a transaction, assigning, by the client computing system, the transaction to the virtual machine; generating, by the virtual machine, as part of the virtual machine processing the transaction, a database modification request associated with the transaction; performing a modification to a shared database responsive to the database modification request associated with the transaction, wherein the shared database is persisted independently of the virtual machine; generating checkpoint data associated with the transaction; responsive to a manual or automatic trigger, discarding, by the client computing system, the virtual machine; and responsive to determining that the transaction is associated with a cyber-attack, using the checkpoint data associated with the transaction to roll back the modification to the shared database performed responsive to the database modification request associated with the transaction.

Example 39

A computing device comprising one or more processors configured to implement the methods of any of examples 21-38.

Example 40

A non-transitory computer readable data storage medium having instructions stored thereon that, when executed, cause a computing system to perform the methods of any of examples 21-38.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method comprising:
    initializing, by a computing system and from one or more common templates, a virtual machine that executes on one or more computing devices of the computing system, wherein the virtual machine is subject to a first refresh policy;
    responsive to an occurrence of an initiation condition of a transaction, assigning, by the computing system, the transaction to the virtual machine based on a determination that the transaction belongs to a first class of transactions, wherein the computing system is configured to assign a different transaction belonging to a second class to another virtual machine that is subject to a second refresh policy, the second class being different from the first class, and the second refresh policy being different from the first refresh policy;

generating, by the virtual machine, as part of the virtual machine processing the transaction of the first class, a database modification request associated with the transaction;

responsive to the database modification request associated with the transaction of the first class, performing a modification to a shared database that is persisted independently of the virtual machine;

generating checkpoint data associated with the transaction of the first class;

responsive to a trigger, discarding, by the computing system, according to the first refresh policy, the virtual machine; and responsive to determining that the transaction is associated with a cyber-attack, using the checkpoint data associated with the transaction of the first class to roll back the modification to the shared database performed responsive to the database modification request associated with the transaction.

2. The method of claim 1, wherein the computing system is a client computing system.

3. The method of claim 1, wherein:

the transaction is a first transaction, the method further comprises assigning one or more additional transactions of the first class to the virtual machine, and responsive to completion of the first transaction and the one or more additional transactions assigned to the virtual machine, discarding, by the computing system, according to the first refresh policy, the virtual machine.

4. The method of claim 3, further comprising:

determining, by the computing system, based on computing resources of the computing system, a maximum number of transactions the computing system assigns to the virtual machine.

5. The method of claim 3, further comprising:

determining, by the computing system, based on a defensive posture of the computing system, a maximum number of transactions that the computing system assigns to the virtual machine.

6. The method of claim 3, further comprising:

determining, by the computing system, based on an identity of a user associated with at least one transaction assigned to the virtual machine, a maximum number of transactions that the computing system assigns to the virtual machine.

7. The method of claim 3, further comprising:

determining, by the computing system, based on the first class, a maximum number of transactions that the computing system assigns to the virtual machine.

8. The method of claim 1, wherein:

the transaction comprises a stream of data from a source, an initiation condition of the transaction comprises receiving the stream of data from the source.

9. The method of claim 8, wherein the stream of data from the source comprises a stream of User Datagram Protocol data.

10. The method of claim 8, wherein the trigger is an elapsing of a particular amount of time following receiving a last unit of data from the source.

11. The method of claim 8, wherein the trigger is an indication of a termination of an application level session.

12. The method of claim 1, wherein the method further comprises:

assigning, by the computing system, transactions belonging to the first class to virtual machines from a plurality of virtual machines that are subject to the first refresh policy;

assigning, by the computing system, transactions belonging to the second class to virtual machines from the plurality of virtual machines that are subject to the second, refresh policy;

generating, by the plurality of virtual machines, as part of the virtual machines processing the transactions belonging to the first class and the transactions belonging to the second class, database modification requests associated with the transactions belonging to the first class and the transactions belonging to the second class;

performing modifications to a shared database responsive to the database modification requests, wherein the shared database is persisted independently of the plurality of virtual machines;

generating checkpoint data associated with the transactions belonging to the first class and the transactions belonging to the second class;

discarding, by the computing system, according to the first refresh policy, the virtual machines subject to the first refresh policy;

discarding, by the computing system, according to the second refresh policy, the virtual machines subject to the second refresh policy; and responsive to determining that a particular transaction is associated with a respective cyber-attack, using checkpoint data associated with the particular transaction to roll back the modification to the shared database performed responsive to a database modification request associated with the particular transaction, wherein the particular transaction is among the transactions belonging to the first class or the transactions belonging to the second class.

13. The method of claim 12, wherein:

discarding the virtual machines subject to the first refresh policy comprises discarding, by the computing system, each respective virtual machine of the virtual machines subject to the first refresh policy after the respective virtual machine has completed processing a first number of transactions; and discarding the virtual machines subject to the second refresh policy comprises discarding, by the computing system, each respective virtual machine of the virtual machines subject to the second refresh policy after the respective virtual machine has completed processing a second number of transactions, wherein the first number of transactions is greater than the second number of transactions.

14. The method of claim 13, wherein the second number of transactions is equal to 1.

15. The method of claim 1, wherein:

the transaction is a first transaction, and the method further comprises:

determining, by the computing system, whether multiple transactions are allowed to be assigned to the virtual machine, wherein a second transaction is already assigned to the virtual machine;

assigning, by the computing system, the first transaction to the virtual machine when multiple transactions are allowed to be assigned to the virtual machine.

16. The method of claim 1, wherein the trigger is a determination, by the computing system, that the virtual machine has become non-operational.

17. The method of claim 1, wherein:
the virtual machine is a first virtual machine,
the method comprises:
  initializing, by the computing system and from the one or more common templates, a plurality of virtual machines that execute at the one or more computing devices of the computing system, the plurality of virtual machines including the first virtual machine;
  responsive to the occurrence of an initiation condition of the transaction, assigning, by the computing system, the transaction to the plurality of virtual machines;
  generating, by the plurality of virtual machines, respective sets of response data;
  selecting, by the computing system, a particular set of response data from the sets of response data; and
  forwarding, by the computing system, the particular set of response data to another computing system.

18. The method of claim 17, wherein selecting the particular set of response data comprises selecting, by the computing system, a most common of the sets of the response data.

19. The method of claim 1, wherein the trigger is a manual trigger.

20. A computing system comprising:
a shared database, and
one or more computing devices configured to:
  initialize, from one or more common templates, a virtual machine that executes on one or more computing devices of the computing system, wherein the virtual machine is subject to a first refresh policy;
  responsive to an occurrence of an initiation condition of a transaction, assign the transaction to the virtual machine based on a determination that the transaction belongs to a first class of transactions, wherein the computing system is configured to assign a different transaction belonging to a second class to another virtual machine that is subject to a second refresh policy, the second class being different from the first class, and the second refresh policy being different from the first refresh policy;
  generate, as part of the virtual machine processing the transaction of the first class, a database modification request associated with the transaction;
  responsive to the database modification request associated with the transaction of the first class, perform a modification to the shared database that is persisted independently of the virtual machine;
  generate checkpoint data associated with the transaction of the first class;
  responsive to a trigger, discard, according to the first refresh policy, the virtual machine; and
  responsive to determining that the transaction is associated with a cyber-attack, use the checkpoint data associated with the transaction of the first class to roll back the modification to the shared database performed responsive to the database modification request associated with the transaction.

21. The computing system of claim 20, wherein the one or more computing devices are further configured to:
  assign transactions belonging to the first class to virtual machines from a plurality of virtual machines that are subject to the first refresh policy;
  assign transactions belonging to the second class to virtual machines from the plurality of virtual machines that are subject to the second refresh policy;
  generate, by the plurality of virtual machines, as part of the virtual machines processing the transactions belonging to the first class and the transactions belonging to the second class, database modification requests associated with the transactions belonging to the first class and the transactions belonging to the second class;
  perform modifications to a shared database responsive to the database modification requests, wherein the shared database is persisted independently of the plurality of virtual machines;
  generate checkpoint data associated with the transactions belonging to the first class and the transactions belonging to the second class;
  discard, by the computing system, according to the first refresh policy, the virtual machines subject to the first refresh policy;
  discard, by the computing system, according to the second refresh policy, the virtual machines subject to the second refresh policy; and
  responsive to determining that a particular transaction is associated with a respective cyber-attack, using checkpoint data associated with the particular transaction to roll back the modification to the shared database performed responsive to a database modification request associated with the particular transaction, wherein the particular transaction is among the transactions belonging to the first class or the transactions belonging to the second class.

22. A non-transitory computer readable data storage medium having instructions stored thereon that, when executed, cause a computing system to:
  initialize, from one or more common templates, a virtual machine that executes on one or more computing devices of the computing system, wherein the virtual machine is subject to a first refresh policy;
  responsive to an occurrence of an initiation condition of a transaction, assign the transaction to the virtual machine based on a determination that the transaction belongs to a first class of transactions, wherein the computing system is configured to assign a different transaction belonging to a second class to another virtual machine that is subject to a second refresh policy, the second class being different from the first class, and the second refresh policy being different from the first refresh policy;
  generate, as part of the virtual machine processing the transaction of the first class, a database modification request associated with the transaction;
  responsive to the database modification request associated with the transaction of the first class, perform a modification to a shared database that is persisted independently of the virtual machine;
  generate checkpoint data associated with the transaction of the first class;
  responsive to a trigger, discard, according to the first refresh policy, the virtual machine; and
  responsive to determining that the transaction is associated with a cyber-attack, use the checkpoint data associated with the transaction of the first class to roll back the modification to the shared database performed responsive to the database modification request associated with the transaction.

23. The non-transitory computer readable data storage medium of claim 22, wherein the instructions, when executed, further cause the computing system to:
assign transactions belonging to the first class to virtual machines from a plurality of virtual machines that are subject to the first refresh policy;
assign transactions belonging to the second class to virtual machines from the plurality of virtual machines that are subject to the second refresh policy;
generate, by the plurality of virtual machines, as part of the virtual machines processing the transactions belonging to the first class and the transactions belonging to the second class, database modification requests associated with the transactions belonging to the first class and the transactions belonging to the second class;
perform modifications to a shared database responsive to the database modification requests, wherein the shared database is persisted independently of the plurality of virtual machines;
generate checkpoint data associated with the transactions belonging to the first class and the transactions belonging to the second class;
discard, by the computing system, according to the first refresh policy, the virtual machines subject to the first refresh policy;
discard, by the computing system, according to the second refresh policy, the virtual machines subject to the second refresh policy; and
responsive to determining that a particular transaction is associated with a respective cyber-attack, using checkpoint data associated with the particular transaction to roll back the modification to the shared database performed responsive to a database modification request associated with the particular transaction, wherein the particular transaction is among the transactions belonging to the first class or the transactions belonging to the second class.

* * * * *

UNITED STATES PATENT AND TRADEMARK OFFICE
CERTIFICATE OF CORRECTION

PATENT NO. : 9,769,250 B2
APPLICATION NO. : 14/791089
DATED : September 19, 2017
INVENTOR(S) : Judson Powers et al.

Page 1 of 1

It is certified that error appears in the above-identified patent and that said Letters Patent is hereby corrected as shown below:

In the Specification

Column 1, Line 14: Insert the following paragraph:
--STATEMENT REGARDING FEDERALLY SPONSORED RESEARCH OR DEVELOPMENT
This invention was made with government support under Contract No. FA8750-11-C-0122 and Contract No. FA8750-12-C-0088 awarded by the United States Air Force. The government has certain rights in this invention.--

Signed and Sealed this
Thirtieth Day of June, 2020

Andrei Iancu
*Director of the United States Patent and Trademark Office*